US010454636B2

(12) United States Patent
Kang et al.

(10) Patent No.: US 10,454,636 B2
(45) Date of Patent: Oct. 22, 2019

(54) METHOD, SYSTEM AND DEVICE FOR DATA TRANSMISSION

(71) Applicant: CHINA ACADEMY OF TELECOMMUNICATIONS TECHNOLOGY, Beijing (CN)

(72) Inventors: Shaoli Kang, Beijing (CN); Shaohui Sun, Beijing (CN); Xiaoming Dai, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 122 days.

(21) Appl. No.: 15/322,079

(22) PCT Filed: Jun. 16, 2015

(86) PCT No.: PCT/CN2015/081552
§ 371 (c)(1),
(2) Date: Dec. 23, 2016

(87) PCT Pub. No.: WO2016/000523
PCT Pub. Date: Jan. 7, 2016

(65) Prior Publication Data
US 2017/0155484 A1    Jun. 1, 2017

(30) Foreign Application Priority Data

Jul. 2, 2014 (CN) .......................... 2014 1 0312309

(51) Int. Cl.
*H04L 5/00* (2006.01)
*H04W 72/04* (2009.01)
(Continued)

(52) U.S. Cl.
CPC .......... *H04L 5/0044* (2013.01); *H04L 1/0041* (2013.01); *H04L 1/06* (2013.01);
(Continued)

(58) Field of Classification Search
CPC .. H04L 5/0044; H04W 72/0453; H04W 52/30
See application file for complete search history.

(56) References Cited

U.S. PATENT DOCUMENTS

2006/0133455 A1   6/2006 Agrawal et al.
2007/0291634 A1  12/2007 Kwon et al.
(Continued)

FOREIGN PATENT DOCUMENTS

CN    101106800 A    1/2008
CN    101120521 A    2/2008
(Continued)

OTHER PUBLICATIONS

Saito et al., Non-Orthogonal Multiple Access (NOMA) for Cellular Future Radio Access, 2013 IEEE 77th Vehicular Technology Conference (VTC Spring), Jun. 1, 2013. (Year: 2013).*
(Continued)

*Primary Examiner* — Shailendra Kumar
(74) *Attorney, Agent, or Firm* — Ladas & Parry, LLP

(57) ABSTRACT

According to embodiments of the present disclosure, a transmitting device processes the signals transmitted by one or more UEs, maps the non-orthogonal characteristic patterns for the processed signals for the one or more UEs so as to superpose the signals for different UEs on the corresponding radio resources, and transmits the processed signals for the one or more UEs in accordance with a mapping result.

5 Claims, 10 Drawing Sheets

(51) Int. Cl.
H04W 52/30 (2009.01)
H04L 1/06 (2006.01)
H04L 1/00 (2006.01)
H04L 27/34 (2006.01)

(52) U.S. Cl.
CPC ............ *H04L 27/34* (2013.01); *H04W 52/30* (2013.01); *H04W 72/0453* (2013.01)

(56) References Cited

U.S. PATENT DOCUMENTS

| | | | |
|---|---|---|---|
| 2009/0160707 A1 | 6/2009 | Lakkis | |
| 2009/0185475 A1 | 7/2009 | Myung | |
| 2010/0035600 A1 | 2/2010 | Hou et al. | |
| 2015/0156786 A1* | 6/2015 | Kim | H04B 7/0452 370/329 |
| 2016/0029350 A1* | 1/2016 | Kishiyama | H04W 16/28 370/329 |

FOREIGN PATENT DOCUMENTS

| | | |
|---|---|---|
| CN | 101145891 A | 3/2008 |
| CN | 101375531 A | 2/2009 |
| CN | 102118216 A | 7/2011 |
| CN | 103607261 A | 2/2014 |
| EP | 1775840 A1 * | 4/2007 |
| EP | 1962463 A1 | 8/2008 |
| TW | 200524330 A | 7/2005 |
| TW | 200935791 A | 8/2009 |
| TW | 201021453 A | 6/2010 |

OTHER PUBLICATIONS

Takeda et al., Enhanced User Fairness Using Non-orthogonal Access with SIC in Cellular Uplink, 2011 IEEE Vehicular Technology Conference (VTC Fall), Sep. 5-8, 2011. (Year: 2011).*
Kim et al., Non-orthogonal Multiple Access in a Downlink Multiuser Beamforming System, 2013 IEEE Military Communications Conference, Nov. 18, 2013. (Year: 2013).*
Endo et al., Uplink Non-orthogonal Access with MMSE-SIC in the Presence of Inter-cell Interference, 2012 International Symposium on Wireless Communication Systems (ISWCS), Aug. 28-31, 2012. (Year: 2012).*
NTT DoCoMo, Requirements, Candidate Solutions & Technology Roadmap for LTE Rel-12 Onward, 3GPP Workshop on Release 12 and onwards, Ljubljana, Slovenia, Jun. 11-12, 2012, RWS-120010. (Year: 2012).*
International Preliminary Report on Patentability (IPRP; CH 1) from PCT/CN2015/081552 dated Jan. 12, 2017 and its English translation provided by WIPO.
From TW Application No. 104121253, Office Action dated Jun. 17, 2016 and English translation provided by associate.
From KR Application No. 10-2017-7001658, Office Action dated Jan. 4, 2018 and English translation provided by associate.
From JP Application No. 2016-575399, Office Action dated Nov. 7, 2017 and its English translation provided by associate.
From EP Application No. 15815217.3, Supplementary European Search Report and Search Opinion dated Jun. 19, 2017.
Benjebbour et al., "Concept and Practical Considerations of Non-orthogonal Multiple Access (NOMA) for Future Radio Access", Intelligent Signal Processing and Communications Systems (ISPACS), 2013 International Symposium on Year: 2013, pp. 770-774.
Saito et al. "Non-orthogonal multiple access (NOMA) for cellular future radio access", the Vehicular Technology Conference (VTC Spring), and 2013 IEEE 77th. 2013, pp. 1-5.
Endo et al.: "A Study on Transmission Power Control Considering Inter-Cell Interference for Non-orthogonal Access with MMSE-SIC in Cellular Uplink"; Proceedings of Workshop of the Institute of Electronics, Information and Communication Engineers vol. 112 No. 89, Japan, Jun. 2012, and pp. 19-24, with machine English translation from Google.
Kimy et al.: "Non-orthogonal Multiple Access in a Downlink Multiuser Beamforming System"; 2013 IEEE Military Communications Conference; Nov. 18, 2013; pp. 1278-1283.
From CN Application No. 201410312309.4, Office Action with Search Report dated Jan. 31, 2018 and its English translation provided by Global Dossier.
International Search Report for PCT/CN2015/081552 dated Sep. 16, 2015 and its English translation provided by WIPO.
Written Opinion of the International Search Authority for PCT/CN2015/081552 dated Sep. 16, 2015 and its English translation provided by WIPO.

* cited by examiner

METHOD, SYSTEM AND DEVICE FOR DATA TRANSMISSION

CROSS-REFERENCE TO RELATED APPLICATIONS

The present application is the U.S. national phase of PCT Application No. PCT/CN2015/081552 filed on Jun. 16, 2015, which claims priority of the Chinese patent application No. 201410312309.4 filed on Jul. 2, 2014, the disclosures of which are incorporated herein by reference in their entireties.

TECHNICAL FIELD

The present disclosure relates to the field of radio communication technology, in particular to a method, a system and a device for data transmission.

BACKGROUND

For the mobile communication, limited radio resources need to be shared by all users, so as to enable different users at different locations to communicate with each other simultaneously and reduce interference as possible. This is just the so-called multiple access technology.

Along with the rapid development of the radio communication, the numbers of users and the amount of services have grown explosively, which thereby puts forward higher requirement on a system capacity of a radio network continuously. Researches show that, the mobile traffic volume has been doubled every year, and in the year of 2020, there will be approximately 50, 000, 000, 000 user equipments (UEs) accessing to the radio mobile network. Due to such an explosive growth, the multiple access technology has become a core issue for the upgrade of the network. The multiple access technology may determine a basic capacity of the network, and may significantly affect the system complexity as well as the deployment cost.

An orthogonal multiple access technology, e.g., frequency-division multiple access technology, time-division multiple access technology, code-division multiple access technology or orthogonal frequency-division multiple access technology, may be adopted by the traditional mobile communication ($1^{st}$ Generation to $4^{th}$ Generation).

Due to the transmission delay and signal multipath propagation, it is necessary to provide, during the design, a protection time for a time-division multiple access system, so as to ensure that the users are orthogonal to each other. Identically, due to the non-ideality of a filter, a bandwidth edge of a signal may not be reduced suddenly, and the out-of-band diffusion may inevitably occur for the signal. At this time, it is necessary to provide a protection bandwidth for a frequency-division multiple access system, so as to ensure the orthogonality. In addition, due to the signal multipath propagation, it is impossible for a code-division multiple access system to ensure the complete orthogonality among code words, which also leads to the capacity losses. For an orthogonal frequency-division multiple access system, there is certain bandwidth overlap among sub-channels so as to improve the band utilization. However, in order to ensure the orthogonality between symbols in a time domain, a Cyclic Prefix may be introduced, which also leads to the loss in system efficiency. The traditional mobile communication system is designed on the basis of the orthogonal multiple access technology and a linear receiver, so as to facilitate the transmission and reception for the system.

In a word, from the point of a multiuser information theory, it is merely able for an orthogonal mode to reach an inner bound of a multiuser capacity region, which results in relatively low radio resource utilization.

SUMMARY

(1) Technical Problem to be Solved

An object of the present disclosure is to provide a method, a system and a device for data transmission, so as to, on the basis of the view point of optimizing an entire multiuser communication system, improve the radio resource utilization through joint processing at both a transmitting device and a receiving device, as compared with the related art where it is merely able for an orthogonal mode to reach an inner bound of a multiuser capacity region. To be specific, at the transmitting device, users may be differentiated from each other on the basis of non-orthogonal characteristic patterns of a plurality of signal domains; and at the receiving device, on the basis of characteristic structures of users' patterns, multiuser detection may be achieved by using a Serial Interference Cancellation (SIC) method, so as to enable the radio resources in the existing time-frequency radio resources to be multiplexed by the users. A technology corresponding to the method, the system and the device for data transmission is called as Pattern Division Non-orthogonal Multiple Access (Pattern Division Multiple Access for short).

(2) Technical Solutions

In one aspect, the present disclosure provides in some embodiments a method for data transmission, including steps of: processing, by a transmitting device, signals transmitted by one or more UEs; mapping, by the transmitting device, non-orthogonal characteristic patterns for the processed signals for the one or more UEs, so as to superpose the signals for different UEs on corresponding radio resources; and transmitting, by the transmitting device, the processed signals for the one or more UEs in accordance with a mapping result.

In one possible embodiment, the step of mapping, by the transmitting device, the non-orthogonal characteristic patterns for the processed signals for the one or more UEs includes: mapping, by the transmitting device, the non-orthogonal characteristic patterns in a separate signal domain or a joint signal domain for the processed signals for the one or more UEs.

In one possible embodiment, the signal domain includes parts of or all of a power domain, a space domain and an encoding domain.

In one possible embodiment, the transmitting device is a network side device. In the case that the non-orthogonal characteristic pattern is a non-orthogonal characteristic pattern in a power domain, the step of mapping, by the transmitting device, the non-orthogonal characteristic patterns for the processed signals for the one or more UEs includes: allocating, by the transmitting device, an identical transmission time and an identical frequency resource to the signals transmitted by the UEs and allocating transmission power to the signals transmitted by the UEs in accordance with the non-orthogonal characteristic patterns in the power domain. And a sum of the transmission power allocated to all the UEs is equal to total system-available power. In another possible embodiment, in the case that the non-orthogonal characteristic pattern is a non-orthogonal characteristic pattern in the space domain, the step of mapping, by the transmitting device, the non-orthogonal characteristic patterns for the processed signals for the UEs includes: allocating, by the transmitting device, an identical transmission time and an identical frequency resource to the signals transmitted by the UEs and allocating at least two transmission antenna ports to the signal transmitted by at least one UE in accordance with the non-orthogonal characteristic patterns in the space domain. At least one of the transmission antenna ports corresponds to the signals transmitted by at least two UEs. In another possible embodiment, the non-orthogonal characteristic pattern is a non-orthogonal characteristic pattern in the encoding domain, and the step of mapping, by the transmitting device, the non-orthogonal characteristic patterns for the processed signals for the UEs includes: allocating, by the transmitting device, an identical transmission time and an identical frequency resource to the signals transmitted by the UEs and allocating different encoding modes and different transmission delays to the signals transmitted by the one or more UEs in accordance with the non-orthogonal characteristic patterns in the encoding domain.

In one possible embodiment, the transmitting device is a network side device. In the case that the non-orthogonal characteristic pattern is a non-orthogonal characteristic pattern in a joint signal domain consisting of the power domain and the space domain, the step of mapping, by the transmitting device, the non-orthogonal characteristic patterns for the processed signals for the UEs includes: allocating, by the transmitting device, an identical transmission time and an identical frequency resource to the signals transmitted by the UEs, allocating transmission power to the signals transmitted by the UEs in accordance with the non-orthogonal characteristic pattern in the joint signal domain consisting of the power domain and the space domain, and allocating at least two transmission antenna ports to the signal transmitted by at least one UE. And a sum of the transmission power allocated to all the UEs is equal to total system-available power; and the at least one of transmission antenna ports corresponds to the signals transmitted by at least two UEs. In another possible embodiment, the non-orthogonal characteristic pattern is a non-orthogonal characteristic pattern in a joint signal domain consisting of the power domain and the encoding domain, the step of mapping, by the transmitting device, the non-orthogonal characteristic patterns for the processed signals for the UEs includes: allocating, by the transmitting device, an identical transmission time and an identical frequency resource to the signals transmitted by the UEs, allocating transmission power to the signals transmitted by the UEs in accordance with the non-orthogonal characteristic patterns in the joint signal domain consisting of the power domain and the encoding domain, and allocating different encoding modes and different transmission delays to the signals transmitted by the UEs. And a sum of the transmission power allocated to all the UEs is equal to total system-available power. In one possible embodiment, in the case that the non-orthogonal characteristic pattern is a non-orthogonal characteristic pattern in a joint signal domain consisting of the space domain and the encoding domain, the step of mapping, by the transmitting device, the non-orthogonal characteristic patterns for the processed signals for the UEs includes: allocating, by the transmitting device, an identical transmission time and an identical frequency resource to the signals transmitted by the UEs, allocating at least two transmission antenna ports to the signal transmitted by at least one UE in accordance with the non-orthogonal characteristic patterns in the joint signal domain consisting of the space domain and the encoding domain, and allocating different encoding modes and different transmission delays to the signals transmitted by each of the UEs. And at least one of the transmission antenna ports corresponds to the signals transmitted by at least two UEs. In another possible embodiment, the non-orthogonal characteristic patterns is a non-orthogonal characteristic pattern in a joint signal domain consisting of the power domain, the space domain and the encoding domain, the step of mapping, by the transmitting device, the non-orthogonal characteristic patterns for the processed signals for the UEs includes: allocating, by the transmitting device, an identical transmission time and an identical frequency resource to the signals transmitted by the UEs, allocating transmission power to the UEs in accordance with the non-orthogonal characteristic patterns in the joint signal domain consisting of the power domain, the space domain and the encoding domain, allocating at least two transmission antenna ports to the signal transmitted by at least one UE, and allocating different encoding modes and different transmission delays to the signals transmitted by each of the UEs. And a sum of the transmission power allocated to all the UEs is equal to total system-available power; and at least one of the transmission antenna ports corresponds to the signals transmitted by at least two UEs.

In one possible embodiment, the transmitting device is a UE. In the case that the non-orthogonal characteristic pattern is a non-orthogonal characteristic pattern in the power domain, the step of mapping, by the transmitting device, the non-orthogonal characteristic pattern for the processed signal for one UE includes: determining, by the transmitting device, a transmission time and a frequency resource for its own signal, and determining transmission power for its own signal in accordance with its own non-orthogonal characteristic pattern in the power domain. And the transmission time and the frequency resource for the signal are identical to those for a signal transmitted by another UE. In another possible embodiment, the non-orthogonal characteristic pattern is a non-orthogonal characteristic pattern in the space domain, the step of mapping, by the transmitting device, the non-orthogonal characteristic pattern for the processed signal for one UE includes: determining, by the transmitting device, a transmission time and a frequency resource for its own signal, and determining a transmission antenna port corresponding to its own signal in accordance with its own non-orthogonal characteristic pattern in the space domain. And the transmission time and the frequency resource for the signal are identical to those for a signal transmitted by another UE. In one possible embodiment, the non-orthogonal characteristic pattern is a non-orthogonal characteristic pattern in the encoding domain, the step of mapping, by the transmitting device, the non-orthogonal characteristic pattern for the processed signal for one UE includes: determining, by the transmitting device, a transmission time and a frequency resource for its own signal, and determining an encoding mode and a transmission delay for its own signal in accordance with its own non-orthogonal characteristic pattern in the encoding domain. And the transmission time and the frequency resource for the signal transmitted by the transmitting device are identical to those for a signal transmitted by another UE; the encoding mode for the signal transmitted by the transmitting device is different from that for the signal transmitted by the other UE; and the transmission delay for the signal transmitted by the transmitting device is different from that for the signal transmitted by the other UE.

In one possible embodiment, the transmitting device is a UE. In the case that the non-orthogonal characteristic pattern is a non-orthogonal characteristic pattern in a joint signal domain consisting of the power domain and the space domain, the step of mapping, by the transmitting device, the non-orthogonal characteristic pattern for the processed signal for one UE includes: determining, by the transmitting device, a transmission time and a frequency resource for its own signal, and determining transmission power and a corresponding transmission antenna port for its own signal in accordance with its own non-orthogonal characteristic pattern in the joint signal domain consisting of the power domain and the space domain. And the transmission time and the frequency resource for the signal transmitted by the transmitting device are identical to those for a signal transmitted by another UE. In another possible embodiment, in the case that the non-orthogonal characteristic pattern is a non-orthogonal characteristic pattern in a joint signal domain consisting of the power domain and the encoding domain, the step of mapping, by the transmitting device, the non-orthogonal characteristic pattern for the processed signal for one UE includes: determining, by the transmitting device, a transmission time and a frequency resource for its own signal, and determining transmission power, an encoding mode and a transmission delay for its own signal in accordance with its own non-orthogonal characteristic pattern in the joint signal domain consisting of the power domain and the encoding domain. And the transmission time and the frequency resource for the signal are identical to those for a signal transmitted by another UE; the encoding mode for the signal transmitted by the transmitting device is different from that for the signal transmitted by the other UE; and the transmission delay for the signal for the transmitting device is different from that for the signal transmitted by the other UE. In one possible embodiment, in the case that the non-orthogonal characteristic pattern is a non-orthogonal characteristic pattern in a joint signal domain consisting of the space domain and the encoding domain, the step of mapping, by the transmitting device, the non-orthogonal characteristic pattern for the processed signal for one UE includes: determining, by the transmitting device, a transmission time and a frequency resource for its own signal, and determining a transmission antenna port, an encoding mode and a transmission delay for its own signal in accordance with its own non-orthogonal characteristic pattern in the joint signal domain consisting of the space domain and the encoding domain. And the transmission time and the frequency resource for the signal transmitted by the transmitting device are identical to those for a signal transmitted by another UE; the encoding mode for the signal transmitted by the transmitting device is different from that for the signal transmitted by the other UE; and the transmission delay for the signal transmitted by the transmitting device is different from that for the signal transmitted by the other UE. In another possible embodiment, the non-orthogonal characteristic pattern is a non-orthogonal characteristic pattern in a joint signal domain consisting of the power domain, the space domain and the encoding domain, the step of mapping, by the transmitting device, the non-orthogonal characteristic pattern for the processed signal for one UE includes: determining, by the transmitting device, a transmission time and a frequency resource for its own signal, and determining a transmission antenna port, transmission power, an encoding mode and a transmission delay for its own signal in accordance with its own non-orthogonal characteristic pattern in the joint signal domain consisting of the power domain, the space domain and the encoding domain. And the transmission time and the frequency resource for the signal transmitted by the transmitting device are identical to those for a signal transmitted by another UE; the encoding mode for the signal transmitted by the transmitting device is different from that for the signal transmitted by the other UE; and the transmission delay for the signal transmitted by the transmitting device is different from that for the signal transmitted by the other UE.

In another aspect, the present disclosure provides in some embodiments a method for data transmission, including steps of: detecting, by a receiving device, non-orthogonal characteristic patterns for received signals transmitted by a plurality of UEs, so as to determine the non-orthogonal characteristic patterns corresponding to the received signal; and detecting, by the receiving device, the received signals in a serial interference cancellation manner using the detected non-orthogonal characteristic patterns, and processing the received signals, so as to determine data for different UEs.

In one possible embodiment, the step of detecting, by the receiving device, the non-orthogonal characteristic patterns for the received signals transmitted by the plurality of UEs includes: detecting, by the receiving device, the non-orthogonal characteristic patterns in a separate signal domain or a joint signal domain for the received signals.

In one possible embodiment, prior to the step of detecting, by the receiving device, the non-orthogonal characteristic pattern for the received signals transmitted by the plurality of the UEs, the method further includes: receiving through signaling, or blind-detecting, by the receiving device, the non-orthogonal characteristic patterns in the separate signal domain or the joint signal domain.

In one possible embodiment, the signal domain includes parts of or all of a power domain, a space domain and an encoding domain.

In one possible embodiment, the step of detecting, by the receiving device, the non-orthogonal characteristic patterns for the received signals transmitted by the plurality of UEs includes: in the case that non-orthogonal characteristic patterns in the power domain are used and the receiving device determines that the received signals transmitted by the plurality of UEs have an identical transmission time and an identical frequency resource but the UEs have different transmission power, determining, by the receiving device, that the non-orthogonal characteristic patterns contained in the received signals are the non-orthogonal characteristic patterns in the power domain. In another possible embodiment, in the case that non-orthogonal characteristic patterns in the space domain are used and the receiving device determines that the received signals transmitted by the plurality of UEs have an identical transmission time and an identical frequency resource, the signal transmitted by at least one UE corresponds to at least two transmission antenna ports and at least one reception antenna port corresponds to the signals transmitted by at least two UEs, determining, by the receiving device, that the non-orthogonal characteristic patterns contained in the received signals are the non-orthogonal characteristic patterns in the space domain. And in another possible embodiment, in the case that the non-orthogonal characteristic patterns in the encoding domain are adopted and the receiving device determines that the received signals transmitted by the plurality of UEs have an identical transmission time and an identical frequency resource and have different encoding modes and different transmission delays, determining, by the receiving device, that the non-orthogonal characteristic patterns contained in the received signals are the non-orthogonal characteristic patterns in the encoding domain.

In one possible embodiment, the step of detecting, by the receiving device, the non-orthogonal characteristic patterns for the received signals transmitted by the plurality of UEs includes: in the case that the non-orthogonal characteristic patterns in a joint signal domain consisting of the power domain and the space domain are adopted, and the receiving device determines that the received signals transmitted by the plurality of UEs have an identical transmission time, an identical frequency resource and different transmission power. And the signal transmitted by at least one UE corresponds to at least two transmission antenna ports and at least one reception antenna port corresponds to the signals transmitted by at least two UEs, determining, by the receiving device, that the non-orthogonal characteristic patterns contained in the received signals are the non-orthogonal characteristic patterns in the joint signal domain consisting of the power domain and the space domain. In another possible embodiment, in the case that the non-orthogonal characteristic patterns in a joint signal domain consisting of the power domain and the encoding domain are adopted, and the receiving device determines that the received signals transmitted by the plurality of UEs have an identical transmission time, an identical frequency resource, different transmission power, different encoding modes and different transmission delays, determining, by the receiving device, that the non-orthogonal characteristic patterns contained in the received signals are the non-orthogonal characteristic patterns in the joint signal domain consisting of the power domain and the encoding domain. In another possible embodiment, in the case that the non-orthogonal characteristic patterns in a joint signal domain consisting of the space domain and the encoding domain, and the receiving device determines that the received signals transmitted by the plurality of UEs have an identical transmission time, an identical frequency resource, different encoding modes and different transmission delays, the signal transmitted by at least one UE corresponding to at least two transmission antenna ports and at least one reception antenna port corresponding to the signals transmitted by at least two UEs, determining, by the receiving device, that the non-orthogonal characteristic patterns contained in the received signals are non-orthogonal characteristic patterns in the joint signal domain consisting of the space domain and the encoding domain. In another possible embodiment, in the case that the non-orthogonal characteristic patterns in a joint signal domain consisting of the power domain, the space domain and the encoding domain are adopted, and the receiving device determines that the received signals transmitted by the plurality of UEs have an identical transmission time, an identical frequency resource, different transmission power, different encoding modes and different transmission delays, the signal transmitted by at least one UE corresponding to at least two transmission antenna ports and at least one reception antenna port corresponding to the signals transmitted by at least two UEs, determining, by the receiving device, that the non-orthogonal characteristic patterns contained in the received signals are the non-orthogonal characteristic patterns in the joint signal domain consisting of the power domain, the space domain and the encoding domain.

In yet another aspect, the present disclosure provides in some embodiments a transmitting device for data transmission, including: a first processing module configured to process signals transmitted by one or more UEs; a characteristic pattern mapping module configured to map non-orthogonal characteristic patterns for the processed signals for the one or more UEs, so as to superpose the signals for different UEs on corresponding radio resources; and a transmission module configured to transmit the processed signals for the one or more UEs in accordance with a mapping result.

In one possible embodiment, the characteristic pattern mapping module is configured to map the non-orthogonal characteristic patterns in a separate signal domain or a joint signal domain for the processed signals for the one or more UEs.

In one possible embodiment, the signal domain includes parts of or all of a power domain, a space domain and an encoding domain.

In one possible embodiment, the transmitting device is a network side device. In the case that non-orthogonal characteristic pattern is a non-orthogonal characteristic pattern in a power domain, the characteristic pattern mapping module is configured to allocate an identical transmission time and an identical frequency resource to the signals transmitted by the UEs and allocate transmission power to the signals transmitted by the UEs in accordance with the non-orthogonal characteristic patterns in the power domain. And a sum of the transmission power allocated to all the UEs is equal to total system-available power. In another possible embodiment, in the case that the non-orthogonal characteristic pattern is a non-orthogonal characteristic pattern in the space domain, the characteristic pattern mapping module is configured to allocate an identical transmission time and an identical frequency resource to the signals transmitted by the UEs and allocate at least two transmission antenna ports to the signal transmitted by at least one UE in accordance with the non-orthogonal characteristic patterns in the space domain. And at least one of the transmission antenna ports corresponds to the signals transmitted by at least two UEs. In the case that the non-orthogonal characteristic pattern is a non-orthogonal characteristic pattern in the encoding domain, the characteristic pattern mapping module is configured to allocate an identical transmission time and an identical frequency resource to the signals transmitted by the UEs and allocate different encoding modes and different transmission delays to the signals transmitted by the one or more UEs in accordance with the non-orthogonal characteristic patterns in the encoding domain.

In one possible embodiment, the transmitting device is a network side device. In the case that the non-orthogonal characteristic pattern is a non-orthogonal characteristic pattern in a joint signal domain consisting of the power domain and the space domain, the characteristic pattern mapping module is configured to allocate an identical transmission time and an identical frequency resource to the signals transmitted by the UEs, allocate transmission power to the signals transmitted by the UEs in accordance with the non-orthogonal characteristic pattern in the joint signal domain consisting of the power domain and the space domain, and allocate at least two transmission antenna ports to the signal transmitted by at least one UE, a sum of the transmission power allocated to all the UEs being equal to total system-available power, and the at least one of transmission antenna ports corresponding to the signals transmitted by at least two UEs. In the case that the non-orthogonal characteristic pattern is a non-orthogonal characteristic pattern in a joint signal domain consisting of the power domain and the encoding domain, the characteristic pattern mapping module is configured to allocate an identical transmission time and an identical frequency resource to the signals transmitted by the UEs, allocate transmission power to the signals transmitted by the UEs in accordance with the non-orthogonal characteristic patterns in the joint signal domain consisting of the power domain and the encoding domain, and allocate different encoding modes and different transmission delays to the signals transmitted by the UEs, and a sum of the transmission power allocated to all the UEs being equal to total system-available power. In the case that the non-orthogonal characteristic pattern is a non-orthogonal characteristic pattern in a joint signal domain consisting of the space domain and the encoding domain, the characteristic pattern mapping module is configured to allocate an identical transmission time and an identical frequency resource to the signals transmitted by the UEs, allocate at least two transmission antenna ports to the signal transmitted by at least one UE in accordance with the non-orthogonal characteristic patterns in the joint signal domain consisting of the space domain and the encoding domain, and allocate different encoding modes and different transmission delays to the signals transmitted by the UEs, and at least one of the transmission antenna ports corresponding to the signals for at least two UEs. In the case that the non-orthogonal characteristic patterns is a non-orthogonal characteristic pattern in a joint signal domain consisting of the power domain, the space domain and the encoding domain, the characteristic pattern mapping module is configured to allocate an identical transmission time and an identical frequency resource to the signals transmitted by the UEs, allocate transmission power to the UEs in accordance with the non-orthogonal characteristic patterns in the joint signal domain consisting of the power domain, the space domain and the encoding domain, allocate at least two transmission antenna ports to the signal transmitted by at least one UE, and allocate different encoding modes and different transmission delays to the signals transmitted by each of the UEs, a sum of the transmission power allocated to all the UEs being equal to total system-available power, and at least one of the transmission antenna ports corresponding to the signals transmitted by at least two UEs.

In one possible embodiment, the transmitting device is a UE. In the case that the non-orthogonal characteristic pattern is a non-orthogonal characteristic pattern in the power domain, the characteristic pattern mapping module is configured to determine a transmission time and a frequency resource for its own signal, and determine transmission power for its own signal in accordance with its own non-orthogonal characteristic pattern in the power domain, and the transmission time and the frequency resource for the signal being identical to those for a signal transmitted by another UE. In the case that the non-orthogonal characteristic pattern is a non-orthogonal characteristic pattern in the space domain, the characteristic pattern mapping module is configured to determine a transmission time and a frequency resource for its own signal, and determine a transmission antenna port corresponding to its own signal in accordance with its own non-orthogonal characteristic pattern in the space domain, and the transmission time and the frequency resource for the signal being identical to those for a signal transmitted by another UE. In the case that the non-orthogonal characteristic pattern is a non-orthogonal characteristic pattern in the encoding domain, the characteristic pattern mapping module is configured to determine a transmission time and a frequency resource for its own signal, and determine an encoding mode and a transmission delay for its own signal in accordance with its own non-orthogonal characteristic pattern in the encoding domain, the transmission time and the frequency resource for the signal transmitted by the transmitting device being identical to those for a signal transmitted by another UE, the encoding mode for the signal transmitted by the transmitting device being different from that for the signal transmitted by the other UE, and the transmission delay for the signal transmitted by the transmitting device being different from that for the signal transmitted by the other UE.

In one possible embodiment, the transmitting device is a UE. In the case that the non-orthogonal characteristic pattern is a non-orthogonal characteristic pattern in a joint signal domain consisting of the power domain and the space domain, the characteristic pattern mapping module is configured to determine a transmission time and a frequency resource for its own signal, and determine transmission power and a corresponding transmission antenna port for its own signal in accordance with its own non-orthogonal characteristic pattern in the joint signal domain consisting of the power domain and the space domain, and the transmission time and the frequency resource for the signal transmitted by the transmitting device are identical to those for a signal transmitted by another UE. In the case that the non-orthogonal characteristic pattern is a non-orthogonal characteristic pattern in a joint signal domain consisting of the power domain and the encoding domain, the characteristic pattern mapping module is configured to determine a transmission time and a frequency resource for its own signal, and determine transmission power, an encoding mode and a transmission delay for its own signal in accordance with its own non-orthogonal characteristic pattern in the joint signal domain consisting of the power domain and the encoding domain, the transmission time and the frequency resource for the signal being identical to those for a signal transmitted by another UE, the encoding mode for the signal transmitted by the transmitting device being different from that for the signal transmitted by the other UE, and the transmission delay for the signal transmitted by the transmitting device being different from that for the signal transmitted by the other UE. In the case that the non-orthogonal characteristic pattern is a non-orthogonal characteristic pattern in a joint signal domain consisting of the space domain and the encoding domain, the characteristic pattern mapping module is configured to determine a transmission time and a frequency resource for its own signal, and determine a transmission antenna port, an encoding mode and a transmission delay for its own signal in accordance with its own non-orthogonal characteristic pattern in the joint signal domain consisting of the space domain and the encoding domain, the transmission time and the frequency resource for the signal transmitted by the transmitting device being identical to those for a signal transmitted by another UE, the encoding mode for the signal transmitted by the transmitting device being different from that for the signal transmitted by the other UE, and the transmission delay for the signal transmitted by the transmitting device being different from that for the signal transmitted by the other UE. In the case that the non-orthogonal characteristic pattern is a non-orthogonal characteristic pattern in a joint signal domain consisting of the power domain, the space domain and the encoding domain, the characteristic pattern mapping module is configured to determine a transmission time and a frequency resource for its own signal, and determine a transmission antenna port, transmission power, an encoding mode and a transmission delay for its own signal in accordance with its own non-orthogonal characteristic pattern in the joint signal domain consisting of the power domain, the space domain and the encoding domain, the transmission time and the frequency resource for the signal transmitted by the transmitting device being identical to those for a signal transmitted by another UE, the encoding mode for the signal transmitted by the transmitting device being different from that for the signal transmitted by the other UE, and the transmission delay for the signal transmitted by the transmitting device being different from that for the signal transmitted by the other UE.

In still yet another aspect, the present disclosure provides in some embodiments a transmitting device for data transmission, including: a processor; a memory connected to the processor via a bus interface and configured to store a program and data used for the operation of the processor; and a transceiver connected to the processor and the memory via the bus interface, and configured to transmit and receive data under the control of the processor. The processor is configured to call and execute the program and data stored in the memory, so as to realize the following steps including: processing signals transmitted by one or more User Equipments (UEs); mapping non-orthogonal characteristic patterns for the processed signals for the one or more UEs, so as to superpose the signals for different UEs on corresponding radio resources; and transmitting the processed signals for the one or more UEs in accordance with a mapping result.

In still yet another aspect, the present disclosure provides in some embodiments a receiving device for data transmission, including: a characteristic pattern detection module configured to detect non-orthogonal characteristic patterns for received signals transmitted by a plurality of UEs, so as to determine the non-orthogonal characteristic patterns corresponding to the received signal; and a second processing module configured to detect the received signals in a serial interference cancellation manner using the detected non-orthogonal characteristic patterns, and process the received signals, so as to determine data for different UEs.

In one possible embodiment, the characteristic pattern detection module is configured to detect the non-orthogonal characteristic patterns in a separate signal domain or a joint signal domain for the received signals.

In one possible embodiment, the characteristic pattern detection module is further configured to receive through signaling, or blind-detecting the non-orthogonal characteristic patterns in the separate signal domain or the joint signal domain.

In one possible embodiment, the signal domain includes parts of or all of a power domain, a space domain and an encoding domain.

In one possible embodiment, the characteristic pattern detection module is configured to: in the case that non-orthogonal characteristic patterns in the power domain are used, the received signals transmitted by the plurality of UEs have an identical transmission time and an identical frequency resource but the UEs have different transmission power, determine that the non-orthogonal characteristic patterns contained in the received signals are the non-orthogonal characteristic patterns in the power domain; or in the case that non-orthogonal characteristic patterns in the space domain are used, the received signals transmitted by the plurality of UEs have an identical transmission time and an identical frequency resource, the signal transmitted by at least one UE corresponds to at least two transmission antenna ports and at least one reception antenna port corresponds to the signals transmitted by at least two UEs, determine that the non-orthogonal characteristic patterns contained in the received signals are the non-orthogonal characteristic patterns in the space domain; or in the case that the non-orthogonal characteristic patterns in the encoding domain are adopted and the received signals transmitted by the plurality of UEs have an identical transmission time and an identical frequency resource and have different encoding modes and different transmission delays, determine that the non-orthogonal characteristic patterns contained in the received signals are the non-orthogonal characteristic patterns in the encoding domain.

In one possible embodiment, the characteristic pattern detection module is configured to: in the case that the non-orthogonal characteristic patterns in a joint signal domain consisting of the power domain and the space domain are adopted, the received signals transmitted by the plurality of UEs have an identical transmission time, an identical frequency resource and different transmission power, the signal transmitted by at least one UE corresponding to at least two transmission antenna ports and at least one reception antenna port corresponds to the signals transmitted by at least two UEs, determine that the non-orthogonal characteristic patterns contained in the received signals are the non-orthogonal characteristic patterns in the joint signal domain consisting of the power domain and the space domain; or in the case that the non-orthogonal characteristic patterns in a joint signal domain consisting of the power domain and the encoding domain are adopted, and the received signals transmitted by the plurality of UEs have an identical transmission time, an identical frequency resource, different transmission power, different encoding modes and different transmission delays, determine that the non-orthogonal characteristic patterns contained in the received signals are the non-orthogonal characteristic patterns in the joint signal domain consisting of the power domain and the encoding domain; or in the case that the non-orthogonal characteristic patterns in a joint signal domain consisting of the space domain and the encoding domain, the received signals transmitted by the plurality of UEs have an identical transmission time, an identical frequency resource, different encoding modes and different transmission delays, the signal transmitted by at least one UE corresponding to at least two transmission antenna ports and at least one reception antenna port corresponding to the signals transmitted by at least two UEs, determine that the non-orthogonal characteristic patterns contained in the received signals are non-orthogonal characteristic patterns in the joint signal domain consisting of the space domain and the encoding domain; or in the case that the non-orthogonal characteristic patterns in a joint signal domain consisting of the power domain, the space domain and the encoding domain are adopted, the received signals transmitted by the plurality of UEs have an identical transmission time, an identical frequency resource, different transmission power, different encoding modes and different transmission delays, the signal transmitted by at least one UE corresponding to at least two transmission antenna ports and at least one reception antenna port corresponding to the signals transmitted by at least two UEs, determine that the non-orthogonal characteristic patterns contained in the received signals are the non-orthogonal characteristic patterns in the joint signal domain consisting of the power domain, the space domain and the encoding domain.

In still yet another aspect, the present disclosure provides in some embodiments a receiving device for data transmission, including: a processor; a memory connected to the processor via a bus interface, and configured to store a program and data desired for the operation of the processor; and a transceiver connected to the processor and the memory via a bus interface, and configured to transmit and receive data under the control of the processor. The processor is configured to call and execute the program and data stored in the memory, so as to realize the following steps including:

detecting non-orthogonal characteristic patterns for received signals transmitted by a plurality of User Equipments (UEs), so as to determine the non-orthogonal characteristic patterns corresponding to the received signal; and detecting the received signals in a Serial Interference Cancellation (SIC) manner using the detected non-orthogonal characteristic patterns, and processing the received signals, so as to determine data for different UEs.

In still yet another aspect, the present disclosure provides in some embodiments a data transmission system, including: a transmitting device configured to process signals transmitted by one or more UEs, map non-orthogonal characteristic patterns for the processed signals for the one or more UEs so as to superpose the signals for different UEs on corresponding radio resources, and transmit the processed signals for the one or more UEs in accordance with a mapping result; and a receiving device configured to detect non-orthogonal characteristic patterns for received signals transmitted by a plurality of UEs, so as to determine the non-orthogonal characteristic patterns corresponding to the received signal, and detect the received signals in a serial interference cancellation manner using the detected non-orthogonal characteristic patterns, and process the received signals, so as to determine data for different UEs.

(3) Beneficial Effects

According to the embodiments of the present disclosure, the transmitting device may process the signals transmitted by one or more UEs, map the non-orthogonal characteristic patterns for the processed signals for the one or more UEs so as to superpose the signals for different UEs on the corresponding radio resources, and transmit the processed signals for the one or more UEs in accordance with a mapping result. As a result, it is able for the signals transmitted by the one or more UEs to be superposed non-orthogonally on the radio resources, thereby to achieve the data transmission in a non-orthogonal multiple access manner, and improve the radio resource utilization.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
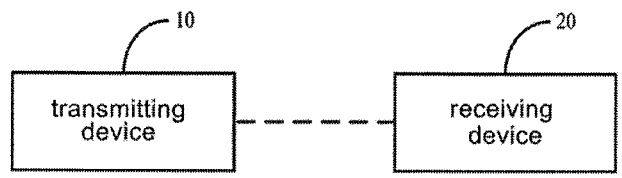
FIG. 1 is a schematic view showing a system for data transmission according to the first embodiment of the present disclosure.

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

According to the embodiments of the present disclosure, a transmitting device may process signals transmitted by one or more UEs, map non-orthogonal characteristic patterns for the processed signals for the one or more UEs so as to superpose the signals transmitted by different UEs on corresponding radio resources, and transmit the processed signals for the one or more UEs in accordance with a mapping result. As a result, it is able for the signals transmitted by the one or more UEs to be superposed non-orthogonally on the radio resources, thereby to achieve the data transmission in a non-orthogonal multiple access manner, and improve the radio resource utilization.

Here, on one hand, the above-mentioned non-orthogonal characteristic patterns refer to superposing patterns of signals having certain characteristics on identical time-domain and frequency-domain resources in such a manner that the signals cannot be divided orthogonally on the same time-domain and frequency-domain resources. On the other hand, the above-mentioned non-orthogonal characteristic patterns refer to transmitting, on the same time-domain and frequency-domain resources, signals for a plurality of users superposed in accordance with their non-orthogonal characteristic patterns, where the signal for each user corresponds to one of the non-orthogonal characteristic patterns.

In the embodiments of the present disclosure, the resources of an existing orthogonal multiple access system may be multiplexed by the plurality of users or the signals for the plurality of users may be directly multiplexed, so as to achieve the non-orthogonal multiple access transmission.

During the implementation, in the case of uplink transmission, the transmitting device is a UE and a receiving device is a network side device. On the other hand, in the case of downlink transmission, the transmitting device is a network side device and the receiving device is a UE.

In the embodiments of the present disclosure, the network side device may be a base station (e.g., macro base station, micro base station or Femtocell), or a relay node (RN) device, or any other network side device that is already known or that may come into being in the future.

The present disclosure will be described hereinafter in more details in conjunction with the drawings and embodiments.

As shown in FIG. 1, the present disclosure provides in the first embodiment a system for data transmission, which includes transmitting device 10 and a receiving device 20.

The transmitting device 10 is configured to process signals transmitted by one or more UEs, map non-orthogonal characteristic patterns for the processed signals transmitted by the one or more UEs so as to superpose the signals for different UEs on corresponding radio resources, and transmit the processed signals for the one or more UEs in accordance with a mapping result.

The receiving device 20 is configured to detect non-orthogonal characteristic patterns for received signals transmitted by a plurality of UEs so as to determine the non-orthogonal characteristic patterns corresponding to the received signal, detect the received signals in a serial interference cancellation (SIC) manner using the detected non-orthogonal characteristic patterns, and process the received signals, so as to determine data for different UEs.

In one possible embodiment, in the case that the transmitting device maps the non-orthogonal characteristic patterns for the processed signals transmitted by the one or more UEs, it may map the non-orthogonal characteristic patterns in a separate signal domain or a joint signal domain for the processed signals for the one or more UEs.

Correspondingly, the receiving device may detect the non-orthogonal characteristic patterns in the separate signal domain or the joint signal domain for the received signals.

In one possible embodiment, the signal domain includes parts of or all of a power domain, a space domain and an encoding domain.

During the implementation, in the case of the uplink transmission, the transmitting device is a UE and the receiving device is a network side device. On the other hand, in the case of downlink transmission, the transmitting device is a network side device and the receiving device is a UE. More details will be given as follows.

Case 1: downlink transmission where the transmitting device is a network side device and the receiving device is a UE.

Mode 1: the non-orthogonal characteristic pattern is a non-orthogonal characteristic pattern in the power domain.

In the case that the transmitting device maps the non-orthogonal characteristic patterns for the processed signals transmitted by the one or more UEs, it may allocate an identical transmission time and an identical frequency resource to the signals transmitted by the UEs and allocate transmission power to the signals transmitted by the UEs in accordance with the non-orthogonal characteristic patterns in the power domain. A sum of the transmission power allocated to all the UEs is equal to total system-available power, so as to differentiate the UEs.

Correspondingly, in the case that the non-orthogonal characteristic pattern is a non-orthogonal characteristic pattern in the power domain and the receiving device determines that the received signals for the UEs have an identical transmission time, an identical frequency resource and different transmission power, it may determine that the non-orthogonal characteristic patterns contained in the received signals are the non-orthogonal characteristic patterns in the power domain.

Unless otherwise defined, all the UEs in the embodiments of the present disclosure are located within an identical region, for example, an identical cell.

During the implementation, the transmission power may be allocated to the signals transmitted by the UEs, and the sum of the transmission power allocated to all the UEs is equal to the total system-available power. In other words, based on a specific constraint, the transmission power may be allocated to the signals transmitted by the UEs superposed on an identical time-frequency resource in accordance with the maximum available transmission power on the time-frequency resource.

For example, in the case that the signals for two UEs are to be transmitted by a base station and the maximum available transmission power is P, the transmission power $\alpha P$ may be allocated to a UE1 and the transmission power $(1-\alpha)P$ may be allocated to a UE2 ($\alpha$ is a power allocation factor, and $0<\alpha<1$).

Mode 2: the non-orthogonal characteristic pattern is a non-orthogonal characteristic pattern in the space domain.

In the case that the transmitting device maps the non-orthogonal characteristic patterns for the processed signals for the UEs, it may allocate an identical transmission time and an identical frequency resource to the signals for the UEs and allocate at least two transmission antenna ports to the signal for at least one UE in accordance with the non-orthogonal characteristic patterns in the space domain. At least one of the transmission antenna ports corresponds to the signals for at least two UEs, so as to differentiate the UEs or data streams for an identical UE. In other words, each signal may be transmitted via a corresponding transmission antenna. For example, in the case that a certain signal corresponds to two antennae, it may be transmitted via the two antennae.

Correspondingly, in the case that the non-orthogonal characteristic pattern in the space domain is adopted, the receiving device determines that the received signals for the UEs have an identical transmission time and an identical frequency resource, the signal for at least one UE corresponds to at least two transmission antenna ports and at least one of the transmission antenna ports corresponds to the signals for at least two UEs, it may determine that the non-orthogonal characteristic patterns contained in the received signals are non-orthogonal characteristic patterns in the space domain.

During the implementation, at least two transmission antenna ports may be allocated to the signal for at least one UE, and at least one transmission antenna port corresponds to the signals for at least two UEs. Each antenna port is a identifiable (recognizable) baseband logic unit, and each baseband logic unit may correspond to one physical antenna or a combination of a plurality of physical antennae.

For example, in the case that the signals for two UEs are to be transmitted by the base station via two antennae, merely one data stream may be transmitted for each UE in an orthogonal transmission mode, i.e., there may exist two data streams. For example, a data stream $S_1$ for the UE1 may be transmitted via a first antenna, and a data stream $S_2$ for the UE2 may be transmitted via a second antenna. However, in a space-domain non-orthogonal transmission mode, more than two data streams may be transmitted by the base station, e.g., an additional data stream $S_3$ may be transmitted to the UE2. In the space-domain non-orthogonal transmission mode without spatial encoding, the data stream $S_1$ for the UE1 may be transmitted via an antenna 1, the data stream $S_2$ for the UE2 may be transmitted via the antenna 1 too, and the data stream $S_3$ for the UE2 may be transmitted via an antenna 2. In other words, the antenna 1 corresponds to the data stream $S_1$ for the UE1 and the data stream $S_2$ for the UE2, and the antenna 2 corresponds to the data stream $S_3$ for the UE2. In the space-domain non-orthogonal transmission mode with spatial encoding, the data stream $S_1$ for the UE1 may be transmitted simultaneously via the antennae 1 and 2, the data stream $S_2$ for the UE2 may be transmitted via the antenna 1, and the data stream $S_3$ for the UE2 may be transmitted via the antenna 2. In other words, the antenna 1 corresponds to the data stream $S_1$ for the UE1 and the data stream $S_2$ for the UE2, and the antenna 2 corresponds to the data stream $S_1$ for the UE1 and the data stream $S_3$ for the UE2. As compared with the space-domain non-orthogonal transmission mode without spatial encoding, it may transmit more information in the space-domain non-orthogonal transmission mode with spatial encoding, so it is able to improve the detection performance of the corresponding receiving device.

Mode 3: the non-orthogonal characteristic pattern is a non-orthogonal characteristic pattern in the encoding domain.

In the case that the transmitting device maps the non-orthogonal characteristic patterns for the processed signals for the UEs, it may allocate an identical transmission time and an identical frequency resource to the signals for the UEs and allocate different encoding modes and different transmission delays to the signals for the one or more UEs in accordance with the non-orthogonal characteristic patterns in the encoding domain, so as to differentiate the UEs.

Correspondingly, in the case that the non-orthogonal characteristic pattern in the encoding domain is adopted and the receiving device determines that the received signals for the UEs have an identical transmission time, an identical frequency resource, different encoding modes and different transmission delays, it may determine that the non-orthogonal characteristic patterns contained in the receiving signals are the non-orthogonal characteristic patterns in the encoding domain.

For example, in the case that the signals for three UEs are to be transmitted by the base station and the encoded data stream for the UE1 is to be transmitted at a certain time, the transmission of the encoded data stream for the UE2 may be delayed by $t_1$ as compared with the transmission of the encoded data stream for the UE1, and the transmission of the encoded data stream for a UE3 may be delayed by $t_2$ as compared with the transmission of the encoded data stream for the UE2.

Mode 4: the non-orthogonal characteristic pattern is a non-orthogonal characteristic pattern in a joint signal domain consisting of the power domain and the space domain.

In the case that the transmitting device maps the non-orthogonal characteristic patterns for the processed signals for the UEs, it may allocate an identical transmission time and an identical frequency resource to the signals for the UEs, allocate transmission power to the signals for the UEs in accordance with the non-orthogonal characteristic pattern in the joint signal domain consisting of the power domain and the space domain, and allocate at least two transmission antenna ports to the signal for at least one UE. A sum of the transmission power allocated to all the UEs is equal to total system-available power, and the at least one transmission antenna port corresponds to the signals for at least two UEs, so as to differentiate the UEs.

Correspondingly, in the case that the non-orthogonal characteristic patterns in the joint signal domain consisting of the power domain and the space domain, the receiving device determines that the received signals for the UEs have an identical transmission time, an identical frequency resource and different transmission power, the signal for at least one UE corresponds to at least two transmission antenna ports and at least one transmission antenna port corresponds to the signals for at least two UEs, the receiving device may determine that the non-orthogonal characteristic patterns contained in the received signals are the non-orthogonal characteristic patterns in the joint signal domain consisting of the power domain and the space domain.

Mode 5: the non-orthogonal characteristic pattern is a non-orthogonal characteristic pattern in a joint signal domain consisting of the power domain and the encoding domain.

In the case that the transmitting device maps the non-orthogonal characteristic patterns for the processed signals for the UEs, it may allocate an identical transmission time and an identical frequency resource to the signals for the UEs, allocate transmission power to the signals for the UEs in accordance with the non-orthogonal characteristic patterns in the joint signal domain consisting of the power domain and the encoding domain, and allocate different encoding modes and different transmission delays to the signals for the UEs, so as to differentiate the UEs. A sum of the transmission power allocated to all the UEs is equal to total system-available power.

Correspondingly, in the case that the non-orthogonal characteristic patterns in the joint signal domain consisting of the power domain and the encoding domain are adopted and the receiving device determines that the received signals for the UEs have an identical transmission time, an identical frequency resource, different transmission power, different encoding modes and different transmission delays, the receiving device may determine that the non-orthogonal characteristic patterns contained in the received signals are the non-orthogonal characteristic patterns in the joint signal domain consisting of the power domain and the encoding domain.

Mode 6: the non-orthogonal characteristic pattern is a non-orthogonal characteristic pattern in a joint signal domain consisting of the space domain and the encoding domain.

In the case that the transmitting device maps the non-orthogonal characteristic patterns for the processed signals for the UEs, it may allocate an identical transmission time and an identical frequency resource to the signals for the UEs, allocate at least two transmission antenna ports to the signal for at least one UE in accordance with the non-orthogonal characteristic patterns in the joint signal domain consisting of the space domain and the encoding domain, and allocate different encoding modes and different transmission delays to the signals for the UEs, so as to differentiate the UEs. At least one of the transmission antenna ports corresponds to the signals for at least two UEs.

Correspondingly, in the case that the non-orthogonal characteristic patterns in the joint signal domain consisting of the space domain and the encoding domain are adopted, the receiving device determines that the received signals for the UEs have an identical transmission time, an identical frequency resource, different encoding modes and different transmission delays, the signal for at least one UE corresponds to at least two transmission antenna ports and at least one transmission antenna port corresponds to the signals for at least two UEs, the receiving device may determine that the non-orthogonal characteristic patterns contained in the received signals are the non-orthogonal characteristic patterns in the joint signal domain consisting of the space domain and the encoding domain.

Mode 7: the non-orthogonal characteristic pattern is a non-orthogonal characteristic pattern in a joint signal domain consisting of the power domain, the space domain and the encoding domain.

In the case that the transmitting device maps the non-orthogonal characteristic patterns for the processed signals for the UEs, it may allocate an identical transmission time and an identical frequency resource to the signals for the UEs, allocate transmission power to the UEs in accordance with the non-orthogonal characteristic patterns in the joint signal domain consisting of the power domain, the space domain and the encoding domain, allocate at least two transmission antenna ports to the signal for at least one UE, and allocate different encoding modes and different transmission delays to the signals for the UEs, so as to differentiate the UEs. A sum of the transmission power allocated to all the UEs is equal to total system-available power, and at least one of the transmission antenna ports corresponds to the signals for at least two UEs.

Correspondingly, in the case that the non-orthogonal characteristic patterns in the joint signal domain consisting of the power domain, the space domain and the encoding domain are adopted, the receiving device determines that the received signals for the UEs have an identical transmission time, an identical frequency resource, different transmission power, different encoding modes and different transmission delays, the signal for at least one UE corresponds to at least two transmission antenna ports and at least one transmission antenna port corresponds to the signals for at least two UEs, the receiving device may determine that the non-orthogonal characteristic patterns contained in the received signals are that the non-orthogonal characteristic patterns in the joint signal domain consisting of the power domain, the space domain and the encoding domain.

Case 2: uplink transmission, where the transmitting device is a UE, and the receiving device is a network side device.

Mode 1: the non-orthogonal characteristic pattern is a non-orthogonal characteristic pattern in the power domain.

In the case that the transmitting device maps the non-orthogonal characteristic pattern for the processed signal for one UE, it may determine a transmission time and a frequency resource for its own signal, and determine transmission power for its own signal in accordance with its own non-orthogonal characteristic pattern in the power domain. The transmission time and the frequency resource for the signal are identical to those for a signal for another UE.

Correspondingly, in the case that the non-orthogonal characteristic patterns in the power domain are adopted and the receiving device determines that the received signals for the UEs have an identical transmission time, an identical frequency resource and different transmission power, the receiving device may determine that the non-orthogonal characteristic patterns contained in the received signals are the non-orthogonal characteristic patterns in the power domain.

Unless otherwise defined, all the UEs in the embodiments of the present disclosure are located within an identical region, e.g., an identical cell.

Mode 2: the non-orthogonal characteristic pattern is a non-orthogonal characteristic pattern in the space domain.

In the case that the transmitting device maps the non-orthogonal characteristic pattern for the processed signal for one UE, it may determine a transmission time and a frequency resource for its own signal, and determine a transmission antenna port corresponding to its own signal in accordance with its own non-orthogonal characteristic pattern in the space domain. The transmission time and the frequency resource for the signal are identical to those for a signal for another UE.

Correspondingly, in the case that the non-orthogonal characteristic pattern in the space domain is adopted, the receiving device determines that the received signals for the UEs have an identical transmission time and an identical frequency resource, the signal for at least one UE corresponds to at least two transmission antenna ports and at least one of the transmission antenna ports corresponds to the signals for at least two UEs, it may determine that the non-orthogonal characteristic patterns contained in the received signals are non-orthogonal characteristic patterns in the space domain.

For example, in the case that the merely one data stream $S_1$ is to be transmitted by the UE via two antennae, it may be transmitted via the antenna 1 and the antenna 2, and in the case that two data streams $S_1$ and $S_2$ are to be transmitted, the data stream $S_1$ may generally be transmitted via the antenna 1 and the data stream $S_2$ may be transmitted via the antenna 2.

Mode 3: the non-orthogonal characteristic pattern is a non-orthogonal characteristic pattern in the encoding domain.

In the case that the transmitting device maps the non-orthogonal characteristic pattern for the processed signal for one UE, it may determine a transmission time and a frequency resource for its own signal, and determine an encoding mode and a transmission delay for its own signal in accordance with its own non-orthogonal characteristic pattern in the encoding domain. The transmission time and the frequency resource for the signal are identical to those for a signal for another UE, the encoding mode for the signal for the transmitting device is different from that for the signal for the other UE, and the transmission delay for the signal for the transmitting device is different from that for the signal for the other UE.

Correspondingly, in the case that the non-orthogonal characteristic pattern in the encoding domain is adopted and the receiving device determines that the received signals for the UEs have an identical transmission time, an identical frequency resource, different encoding modes and different transmission delays, it may determine that the non-orthogonal characteristic patterns contained in the receiving signals are the non-orthogonal characteristic patterns in the encoding domain.

Mode 4: the non-orthogonal characteristic pattern is a non-orthogonal characteristic pattern in a joint signal domain consisting of the power domain and the space domain.

In the case that the transmitting device maps the non-orthogonal characteristic pattern for the processed signal for one UE, it may determine a transmission time and a frequency resource for its own signal, and determine transmission power and a corresponding transmission antenna port for its own signal in accordance with its own non-orthogonal characteristic pattern in the joint signal domain consisting of the power domain and the space domain. The transmission time and the frequency resource for the signal are identical to those for a signal for another UE.

Correspondingly, in the case that the non-orthogonal characteristic patterns in the joint signal domain consisting of the power domain and the space domain, the receiving device determines that the received signals for the UEs have an identical transmission time and an identical frequency resource, the signals for at least two UEs have different transmission power, the signal for at least one UE corresponds to at least two transmission antenna ports and at least one transmission antenna port corresponds to the signals for at least two UEs, the receiving device may determine that the non-orthogonal characteristic patterns contained in the received signals are the non-orthogonal characteristic patterns in the joint signal domain consisting of the power domain and the space domain.

Mode 5: the non-orthogonal characteristic pattern is a non-orthogonal characteristic pattern in a joint signal domain consisting of the power domain and the encoding domain.

In the case that the transmitting device maps the non-orthogonal characteristic pattern for the processed signal for one UE, it may determine a transmission time and a frequency resource for its own signal, and determine transmission power, an encoding mode and a transmission delay for its own signal in accordance with its own non-orthogonal characteristic pattern in the joint signal domain consisting of the power domain and the encoding domain. The transmission time and the frequency resource for the signal for the transmitting device are identical to those for a signal for another UE, the encoding mode for the signal for the transmitting device is different from that for the signal for the other UE, and the transmission delay for the signal for the transmitting device is different from that for the signal for the other UE.

Correspondingly, in the case that the non-orthogonal characteristic patterns in the joint signal domain consisting of the power domain and the encoding domain are adopted, the receiving device determines that the received signals for the UEs have an identical transmission time and an identical frequency resource, and the signals for at least two UEs have different transmission power, different encoding modes and different transmission delays, the receiving device may determine that the non-orthogonal characteristic patterns contained in the received signals are the non-orthogonal characteristic patterns in the joint signal domain consisting of the power domain and the encoding domain.

Mode 6: the non-orthogonal characteristic pattern is a non-orthogonal characteristic pattern in a joint signal domain consisting of the space domain and the encoding domain.

In the case that the transmitting device maps the non-orthogonal characteristic pattern for the processed signal for one UE, it may determine a transmission time and a frequency resource for its own signal, and determine a transmission antenna port, an encoding mode and a transmission delay for its own signal in accordance with its own non-orthogonal characteristic pattern in the joint signal domain consisting of the space domain and the encoding domain. The transmission time and the frequency resource for the signal for the transmitting device are identical to those for a signal for another UE, the encoding mode for the signal for the transmitting device is different from that for the signal for the other UE, and the transmission delay for the signal for the transmitting device is different from that for the signal for the other UE.

Correspondingly, in the case that the non-orthogonal characteristic patterns in the joint signal domain consisting of the space domain and the encoding domain are adopted, the receiving device determines that the received signals for the plurality of UEs have an identical transmission time and an identical frequency resource, the signals for at least two UEs have different encoding modes and different transmission delays, the signal for at least one UE corresponds to at least two transmission antenna ports and at least one transmission antenna port corresponds to the signals for at least two UEs, the receiving device may determine that the non-orthogonal characteristic patterns contained in the received signals are the non-orthogonal characteristic patterns in the joint signal domain consisting of the space domain and the encoding domain.

Mode 7: the non-orthogonal characteristic pattern is a non-orthogonal characteristic pattern in a joint signal domain consisting of the power domain, the space domain and the encoding domain.

In the case that the transmitting device maps the non-orthogonal characteristic pattern for the processed signal for one UE, it may determine a transmission time and a frequency resource for its own signal, and determine a transmission antenna port, transmission power, an encoding mode and a transmission delay for its own signal in accordance with its own non-orthogonal characteristic pattern in the joint signal domain consisting of the power domain, the space domain and the encoding domain. The transmission time and the frequency resource for the signal for the transmitting device are identical to those for a signal for another UE, the encoding mode for the signal for the transmitting device is different from that for the signal for the other UE, and the transmission delay for the signal for the transmitting device is different from that for the signal for the other UE, so as to differentiate the plurality of UEs.

Correspondingly, in the case that the non-orthogonal characteristic patterns in the joint signal domain consisting of the power domain, the space domain and the encoding domain are adopted, the receiving device determines that the received signals for the UEs have an identical transmission time and an identical frequency resource, the signals for at least two UEs have different transmission power, different encoding modes and different transmission delays, the signal for at least one UE corresponds to at least two transmission antenna ports and at least one transmission antenna port corresponds to the signals for at least two UEs, the receiving device may determine that the non-orthogonal characteristic patterns contained in the received signals are that the non-orthogonal characteristic patterns in the joint signal domain consisting of the power domain, the space domain and the encoding domain.

During the multiuser detection performed by the receiving device in a SCI manner, the detection signals for the UEs may be separated level by level, and the co-channel interference may be canceled in time, so as to improve the detection accuracy.

In the embodiments of the present disclosure, through the joint processing at both the transmitting device and the receiving device, it is able for the existing time-frequency radio resources to be multiplexed by the UEs. To be specific, at the transmitting device, the UEs may be differentiated from each other on the basis of the non-orthogonal characteristic patterns of a plurality of signal domains, and at the receiving device, on the basis of characteristic structures of users' patterns, the multiuser detection may be achieved in a SIC manner. A technology corresponding to the method, the system and the device for data transmission is called as Pattern Division Non-orthogonal Multiple Access (Pattern Division Multiple Access (PDMA) for short) technology.

Figure 2:
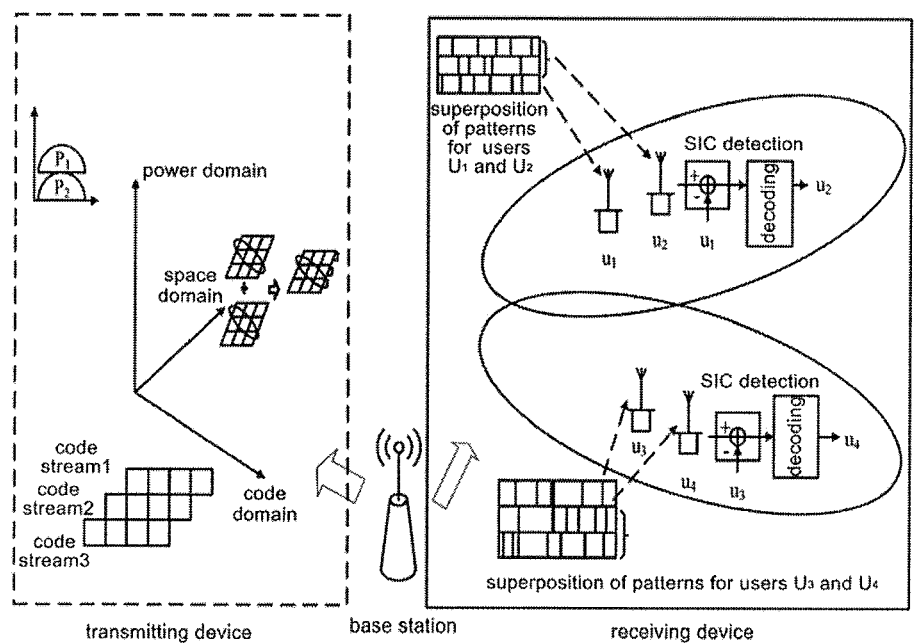
FIG. 2 is a schematic view showing pattern division multiple access architecture according to one embodiment of the present disclosure.

In the embodiments of the present disclosure, the PDMA technology may be applied to both an uplink and a downlink of a communication system. As shown in FIG. 2 which is a schematic view showing PDMA architecture, a base station includes a transmitting device and a receiving device. During the transmission, a signal for the downlink may be modulated and transmitted by the transmitting device, and during the reception, a signal for the uplink may be received and detected by the receiving device. Different from a traditional frequency division multiple access (FDMA)/time division multiple access (TDMA)/code division multiple access (CDMA)/orthogonal frequency division multiple access (OFDMA) system where the information for the UEs is differentiated from each other through an orthogonal signal domain (e.g., a time domain, a frequency domain or a code domain), for a PDMA system, the signals for the UEs may be differentiated from each other at the transmitting device using the non-orthogonal characteristic patterns in the separate signal domain or the joint signal domain consisting of the power domain, the space domain and the encoding domain, and the signals for the UEs maybe effectively detected at the receiving device in a SIC manner. As a result, it is able for the UEs to transmit the data non-orthogonally in the time-frequency domain, thereby to improve the spectrum utilization.

Figure 3A:
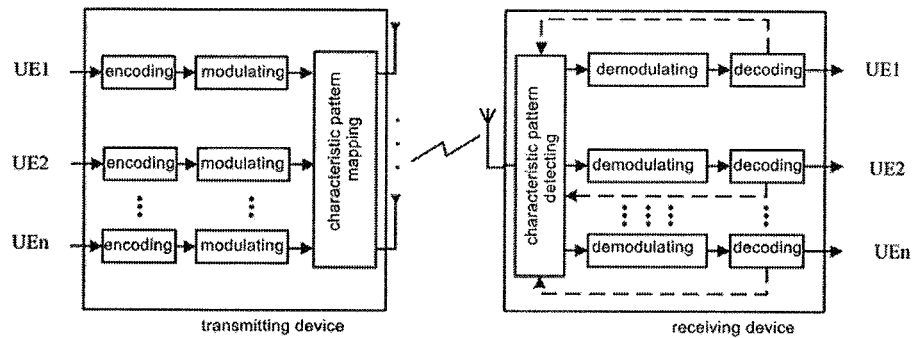
FIG. 3A is a schematic view showing a downlink for the pattern division multiple access architecture according to one embodiment of the present disclosure.

For clarification, the base station may transmit the signals via multiple antennae, and each UE may receive the signal via a single antenna. FIG. 3A shows the downlink for the PDMA system.

In FIG. 3A, the transmitting device may process (e.g., encode and modulate) the signals for the plurality of UEs, and then map the non-orthogonal characteristic patterns, so as to achieve the non-orthogonal superposition of the signals for the UEs in the time-frequency domain.

In FIG. 3A, the receiving device (e.g., a UE) may detect and preliminarily identify the non-orthogonal characteristic patterns for the received and superposed signals for the UEs, and then detect the valid UEs through processing the preliminarily-identified signals in a SIC manner.

In the case that each UE receives the signal via multiple antennae, the operation procedures for the transmitting device and the receiving device are similar to the operation procedures where the signal is received via a single antenna. The only difference lies in that the signal may be received via multiple antennae.

Figure 3B:
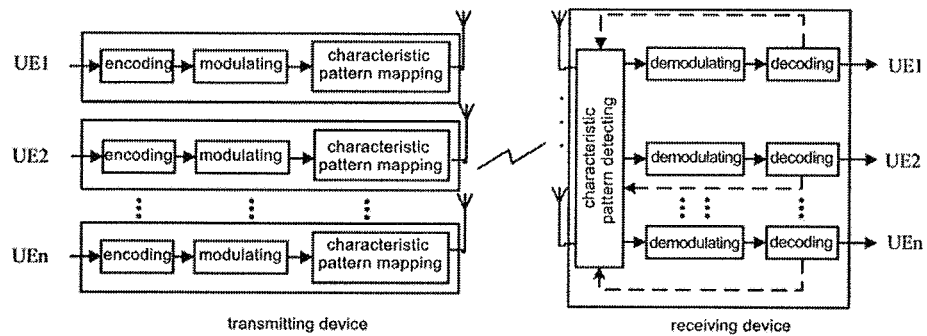
FIG. 3B is a schematic view showing an uplink for the pattern division multiple access architecture according to one embodiment of the present disclosure.

For clarification, the UE may transmit the signal via a single antenna, and the base station may receive the signals via multiple antennae. FIG. 3B shows an uplink for the PDMA system.

In FIG. 3B, at the transmitting device, in the case of N UEs, each UE may encode and modulate its own signal, and then the transmitting device may map the non-orthogonal characteristic patterns, so as to achieve the non-orthogonal superposition of the signals for the UEs in an identical time-frequency domain.

In FIG. 3B, at the receiving device, the base station may detect and preliminarily identify the non-orthogonal characteristic patterns for the received and superposed signals for the UEs, and then detect the UEs through processing the preliminarily-identified signals in a SIC manner.

In the case that each UE transmits the signal via multiple antennae, the operation procedures for the transmitting device and the receiving device are similar to the operation procedures where the signal is transmitted via a single antenna. The only difference lies in that the signal may be transmitted via multiple antennae.

The non-orthogonal characteristic pattern may be a non-orthogonal characteristic pattern in a separate signal domain, e.g., a non-orthogonal characteristic pattern in the power domain, a non-orthogonal characteristic pattern in the space domain or a non-orthogonal characteristic pattern in the encoding domain; or a non-orthogonal characteristic pattern in a joint signal domain, e.g., a non-orthogonal characteristic pattern in a joint signal domain consisting of the power domain and the space domain, non-orthogonal characteristic pattern in a joint signal domain consisting of the power domain and the encoding domain, a non-orthogonal characteristic pattern in a joint signal domain consisting of the space domain and the encoding domain, or a non-orthogonal characteristic pattern in a joint signal domain consisting of the power domain, the space domain and the encoding domain.

Figure 5A:
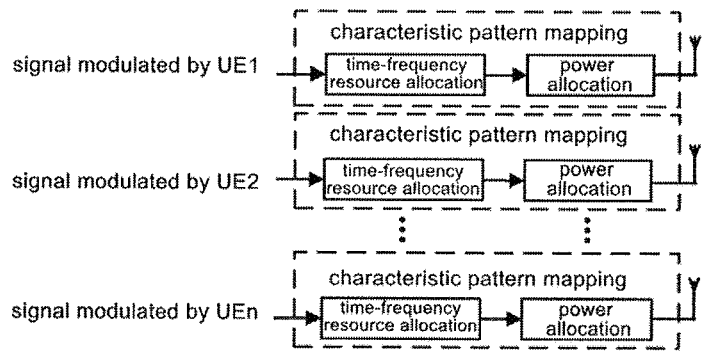
FIG. 5A is a schematic view showing an uplink during the mapping of non-orthogonal characteristic patterns in the power domain according to one embodiment of the present disclosure.
Figure 5B:
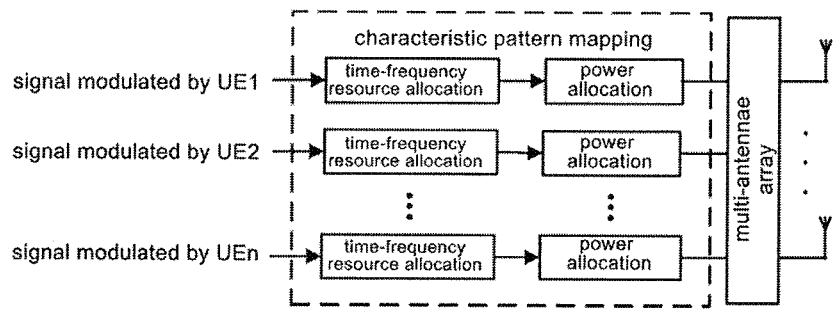
FIG. 5B is a schematic view showing a downlink during the mapping of the non-orthogonal characteristic patterns in the power domain according to one embodiment of the present disclosure.

For a power-domain pattern division technology, the power may be allocated in accordance with channel quality of the UE, and theoretically all the time-frequency resources of a system may be occupied by each UE. At the transmitting device, an auxiliary user scheduling algorithm is provided, and at the receiving device, the SIC is performed, so as to increase the system capacity and the capacity for each UE (especially the capacity for the UE at a cell edge). FIG. 5A and FIG. 5B each shows the mapping procedures of the non-orthogonal characteristic patterns in the power domain on the uplink and the downlink respectively. Each mapping procedure includes two basic procedures, i.e., the allocation of the time-frequency resources and the allocation of the power. Although shown in FIG. 5A and FIG. 5B, the order of these two basic procedures is not particularly defined herein, which can be swapped up.

Figure 4A:
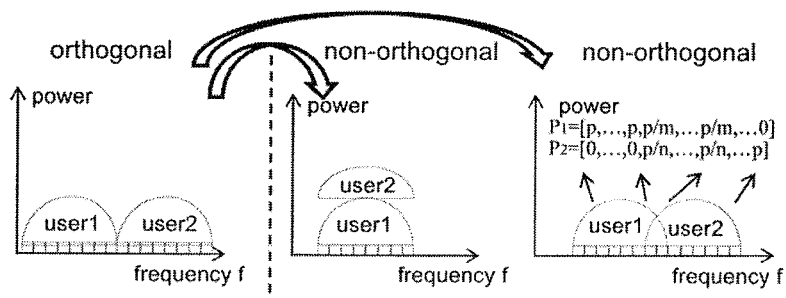
FIG. 4A is a schematic view showing an orthogonal multiple access technology and a non-orthogonal multiple access technology in a power domain according to one embodiment of the present disclosure.

Taking the non-orthogonal characteristic pattern in the power domain as an example, FIG. 4A shows the difference in the occupation of the radio resources between the non-orthogonal mode and the orthogonal mode. In the orthogonal mode, different frequency resources may be adopted by different UEs. However, in the non-orthogonal mode, an identical frequency resource and different power may be adopted by different UEs, so as to differentiate the UEs from one another. The non-orthogonal characteristic pattern in the power domain includes power vectors corresponding to respective time-frequency resource blocks for the UEs.

Figure 6A:
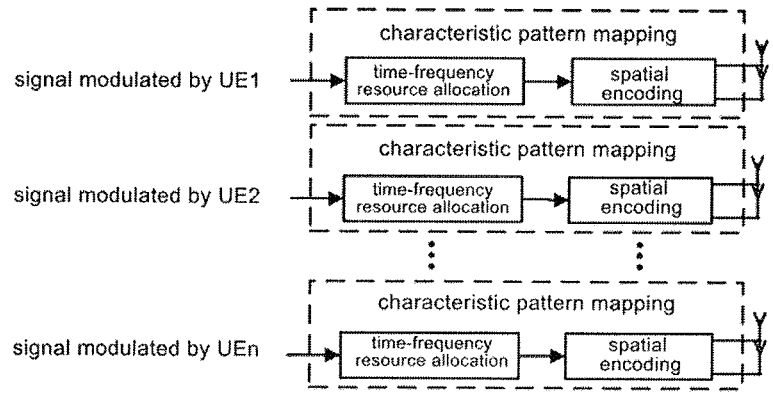
FIG. 6A is a schematic view showing an uplink during the mapping of the non-orthogonal characteristic patterns in the space domain according to one embodiment of the present disclosure.
Figure 6B:
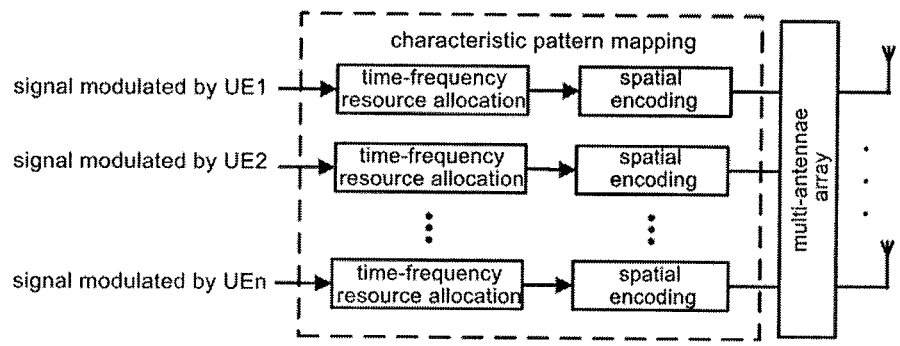
FIG. 6B is a schematic view showing a downlink during the mapping of the non-orthogonal characteristic patterns in the space domain according to one embodiment of the present disclosure.

For a space-domain pattern division technology, the signals for the UEs may be spatially encoded in a SIC manner, so as to effectively divide the signals for the UEs after the SIC detection, thereby to achieve the multiple access. FIG. 6A and FIG. 6B each shows the mapping procedures of the non-orthogonal characteristic patterns in the space domain on the uplink and the downlink respectively. Each mapping procedure includes two basic procedures, i.e., the allocation of the time-frequency resources and the spatial encoding. Although shown in FIG. 6A and FIG. 6B, the order of these two basic procedures is not particularly defined herein, which can be swapped up.

Figure 4B:
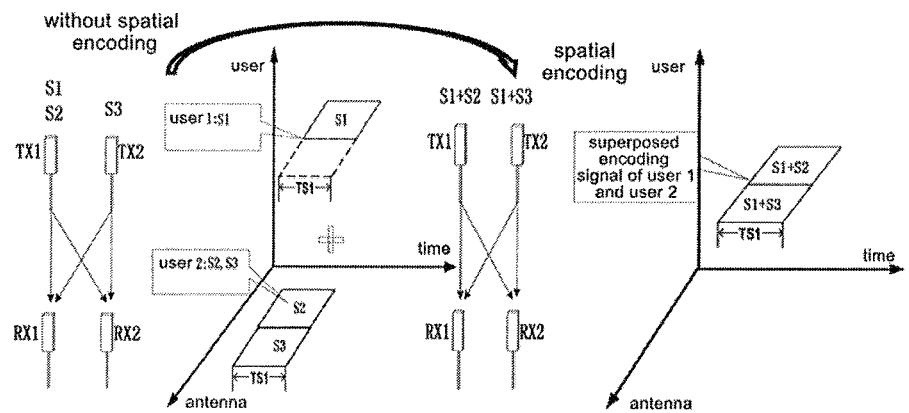
FIG. 4B is a schematic view showing the orthogonal multiple access technology and the non-orthogonal multiple access technology in a space domain according to one embodiment of the present disclosure.

Taking the non-orthogonal characteristic pattern in the space domain as an example, FIG. 4B shows the difference in the occupation of the radio resources between the non-orthogonal mode without spatial encoding and the non-orthogonal mode with spatial encoding. In the non-orthogonal mode without spatial encoding, the signal for the UE1 may merely be transmitted via the antenna 1, and the signal for the UE2 may be transmitted via the antennae 1 and 2, so it is very difficult to simultaneously detect the signals for the UE1 and the UE2 merely through the antenna 1. However, in the non-orthogonal mode with spatial encoding, the signal for the UE1 may be simultaneously transmitted via the antennae 1 and 2, and the signals for multiple UEs may be superposed on each antenna. As a result, it is able for the receiving device to receive the information via the antennae and perform the multiuser detection, thereby to improve the detection accuracy. The non-orthogonal characteristic pattern in the space domain is a spatial encoding matrix for each UE in different antennae arrays.

Figure 7A:
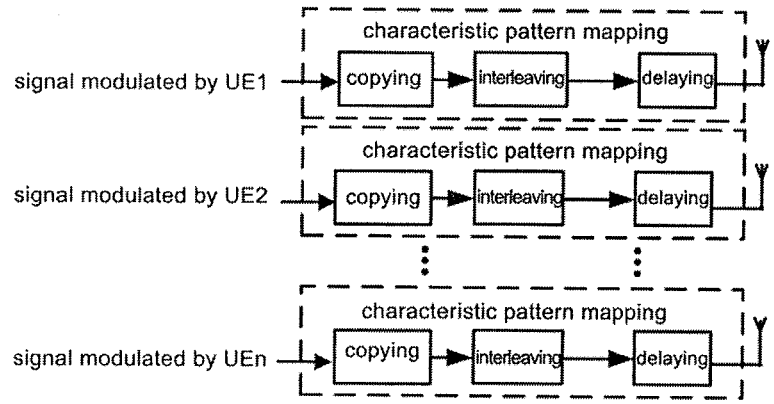
FIG. 7A is a schematic view showing an uplink during the mapping of the non-orthogonal characteristic patterns in the encoding domain according to one embodiment of the present disclosure.
Figure 7B:
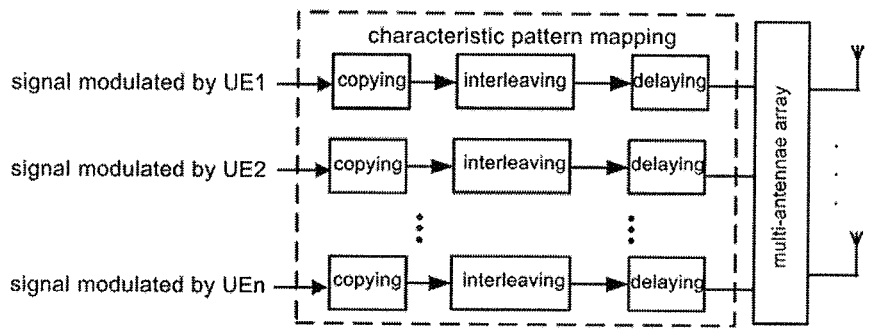
FIG. 7B is a schematic view showing a downlink during the mapping of the non-orthogonal characteristic patterns in the encoding domain according to one embodiment of the present disclosure.

For an encoding-domain pattern division technology, the data streams for the UEs may be encoded and then delayed, i.e., multi-stream superposition may be performed on the data streams. To be specific, a structure similar to a channel encoding structure may be established between the data for the UEs, and then the structure may be optimized on the basis of a channel encoding theory. FIG. 7A and FIG. 7B each shows the mapping procedures of the non-orthogonal characteristic patterns in the encoding domain on the uplink and the downlink respectively. Each mapping procedure includes three basic procedures, i.e., copying, interleaving and delaying. The copying and interleaving procedures just refer to the data encoding procedure. Although shown in FIG. 7A and FIG. 7B, the order of the data encoding procedure and the delaying procedure is not particularly defined herein, which can be swapped up.

Figure 4C:
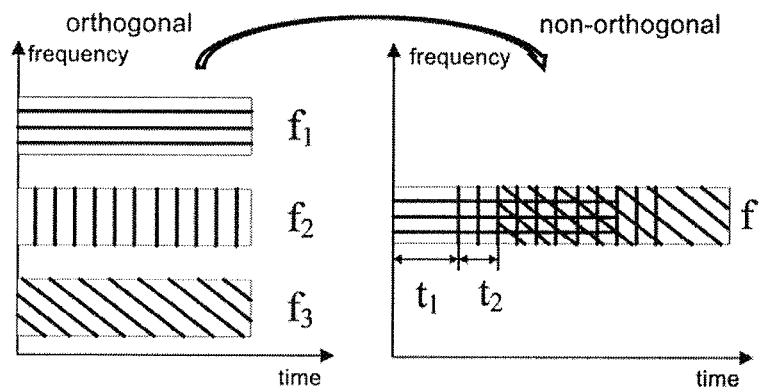
FIG. 4C is a schematic view showing the orthogonal multiple access technology and the non-orthogonal multiple access technology in an encoding domain according to one embodiment of the present disclosure.

Taking the non-orthogonal characteristic pattern in the encoding domain as an example, FIG. 4C shows the difference in the occupation of the radio resources between non-orthogonal mode and the orthogonal mode. In the orthogonal mode, different frequency resources may be adopted by different UEs. However, in the non-orthogonal mode, an identical frequency resource, different encoding modes and different transmission delays may be adopted by different UEs, so as to differentiate the UEs from one another. The non-orthogonal characteristic pattern in the encoding domain refers to an encoding sequence and a corresponding transmission delay for each UE.

Figure 8A:
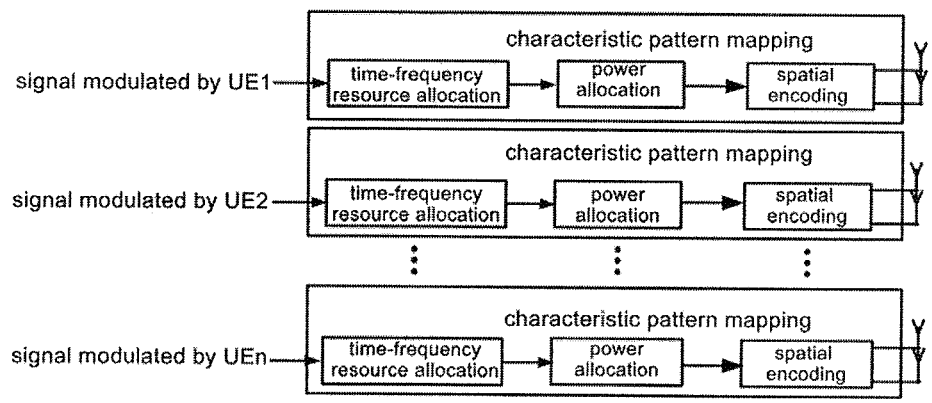
FIG. 8A is a schematic view showing an uplink during the mapping of the non-orthogonal characteristic patterns in a joint signal domain consisting the power domain and the space domain according to one embodiment of the present disclosure.
Figure 8B:
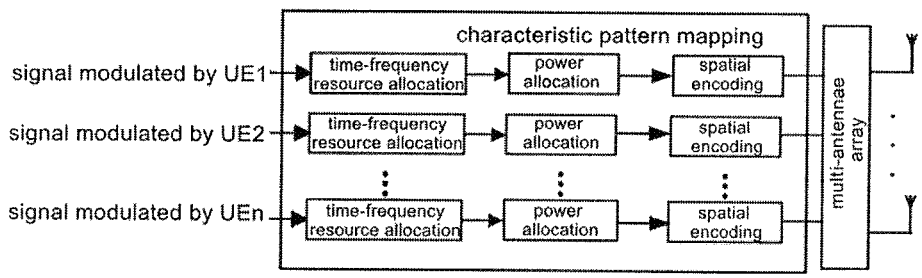
FIG. 8B is a schematic view showing a downlink during the mapping of the non-orthogonal characteristic patterns in the joint signal domain consisting the power domain and the space domain according to one embodiment of the present disclosure.
Figure 9A:
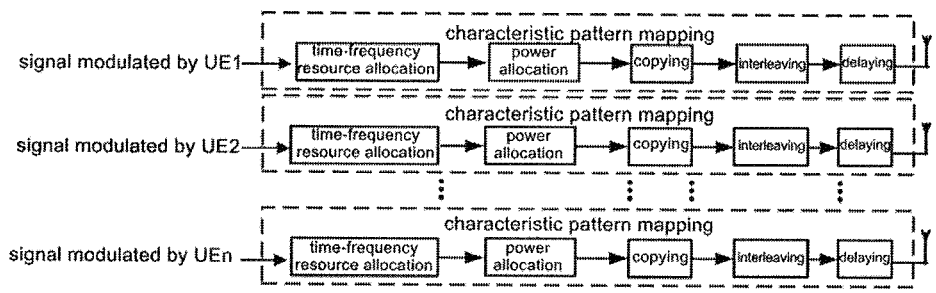
FIG. 9A is a schematic view showing an uplink during the mapping of the non-orthogonal characteristic patterns in a joint signal domain consisting the power domain and the encoding domain according to one embodiment of the present disclosure.
Figure 9B:
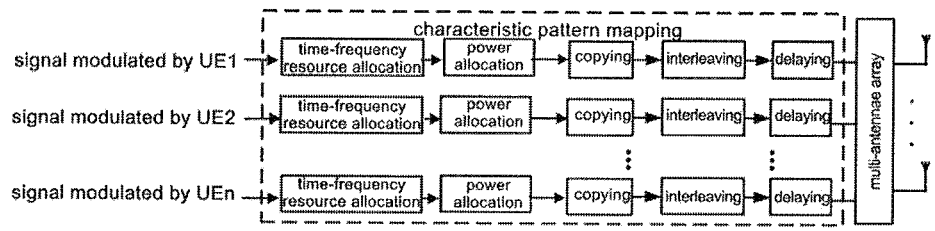
FIG. 9B is a schematic view showing a downlink during the mapping of the non-orthogonal characteristic patterns in the joint signal domain consisting the power domain and the encoding domain according to one embodiment of the present disclosure.

FIG. 8A and FIG. 8B each shows the mapping procedures of the non-orthogonal characteristic patterns in the joint signal domain consisting of the power domain and the space domain on the uplink and the downlink respectively, and FIG. 9A and FIG. 9B each shows the mapping procedures of the non-orthogonal characteristic patterns in the joint signal domain consisting of the power domain and the encoding domain on the uplink and the downlink respectively. The mapping procedures of the non-orthogonal characteristic patterns in the other joint signal domains may be easily deducible and thus will not be particularly defined herein. Although shown in the drawings, the order of the basic procedures of each mapping procedure is not particularly defined herein.

Figure 4D:
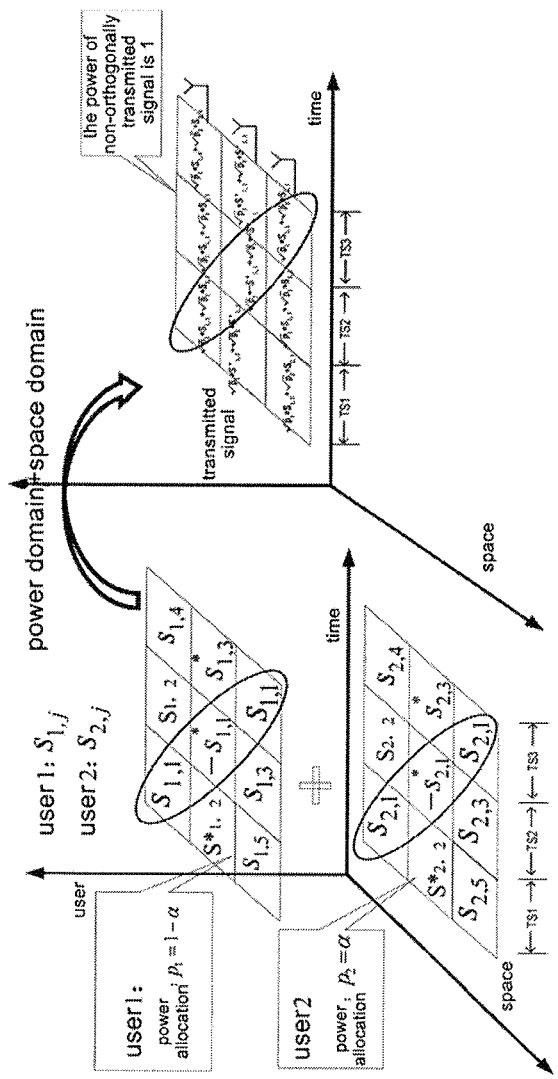
FIG. 4D is a schematic view showing the orthogonal multiple access technology and the non-orthogonal multiple access technology in a joint signal domain consisting of the power domain and the space domain according to one embodiment of the present disclosure.

Taking the non-orthogonal characteristic pattern in the joint signal domain consisting of the power domain and the space domain as an example, FIG. 4D shows the superposition of the signals for the UEs in the power domain and the space domain. An identical time-frequency resource may be adopted by different UEs, but these UEs may be differentiated from one another in terms of the power and the spatial encoding. The non-orthogonal characteristic pattern in the joint signal domain consisting of the power domain and the space domain is a combination of the non-orthogonal characteristic pattern in the power domain and the non-orthogonal characteristic pattern in the space domain.

As shown in FIG. 4D, in the non-orthogonal mode, ten symbols may be transmitted via each data block, while in the orthogonal mode, merely nine symbols may be transmitted via each data block. In other words, as compared with the orthogonal mode, it is able for the non-orthogonal mode to improve the spectrum utilization and the diversity (to reduce an error rate).

The other non-orthogonal characteristic patterns may be similar to those mentioned above, and thus will not be particularly defined herein.

In the embodiments of the present disclosure, the PDMA technology has been described hereinbefore mainly taking the power domain, the space domain and the encoding domain as an example. In actual use, the non-orthogonal characteristic pattern in other potential signal domains may also be used. Especially, the non-orthogonal characteristic pattern at the transmitting device may be designed in such a manner as to facilitate the SIC detection at the receiving device, so as to improve the system performance and reduce the system complexity. On one hand, the mapping procedure at the transmitting device may be used to effectively divide the user information, and the patterns may be differentiated from one another at the receiving device. On the other hand, at the receiving device, the effective SIC may be performed on the selected pattern(s), so as to achieve the multiuse data transmission. Neither of the above can exist effectively without the other.

The data transmission system in the embodiments of the present disclosure may be applied to a $3^{rd}$-Generation (3G) mobile communication system on the basis of CDMA, or a $4^{th}$-Generation (4G) mobile communication system on the basis of OFDMA. A superposition technology for the existing mobile communication system may be adopted, so as to further improve the system capacity and the spectrum utilization. In addition, the data transmission system in the embodiments of the present disclosure may also be applied to a future $5^{th}$-Generation (5G) mobile communication system, so as to meet the requirement on the capacity.

Through the adaptive selection of the non-orthogonal characteristic pattern in the separate signal domain or the joint signal domain, the PDMA technology in the embodiments of the present disclosure may be adapted to various application scenarios for a $5^{th}$-Generation system. For example, through the adaptive allocation of the non-orthogonal characteristic pattern in the power domain, the PDMA technology may be used to overcome a near-far effect, and improve the coverage performance at a cell edge. In a heterogeneous network with both a macro cellular network and micro cellular networks, through the joint optimization of the non-orthogonal characteristic pattern in the power domain and the encoding domain, the PDMA technology may be dynamically adapted to a change in the network structure, so as to flexibly transmit the signals for the UEs. In a typical scenario where distributed antennae or a large quantity of cells are provided, through the joint optimization of the non-orthogonal characteristic pattern in the space domain and the encoding domain (or in more domains), the PDMA technology may be used to inhibit the co-channel interference from a variety of sources, reduce the power consumption and improve the spectrum utilization. In a low-power-consumption and large-number-connection Internet of Things, the PDMA technology may be used to double the number of the uplink access users. In a low-delay and high-reliability Internet of Things (IOT), the PDMA technology may be used to perform redundancy transmission, so as to improve the reliability of the data transmission.

In a word, the characteristic pattern used in the PDMA technology refers to the non-orthogonal division of the pattern in several signal domains (for example, the power domain, the space domain and the encoding domain) with respect to UE's attributes, rather than the orthogonal division on the basis of the time-frequency radio resources. Accordingly, it is unnecessary to strictly limit the number of the radio resources, thereby to remarkably increase the system capacity and improve the adaptability to the dynamic scenarios.

Figure 10:
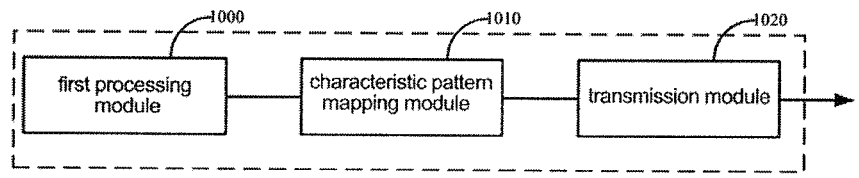
FIG. 10 is a schematic view showing a transmitting device in the system for data transmission according to the second embodiment of the present disclosure.

As shown in FIG. 10, the present disclosure provides in the second embodiment a transmitting device in the system for data transmission, which includes: a first processing module 1000 configured to process signals for one or more UEs; a characteristic pattern mapping module 1010 configured to map non-orthogonal characteristic patterns for the processed signals for the one or more UEs, so as to superpose the signals for different UEs on corresponding radio resources; and a transmission module 1020 configured to transmit the processed signals for the one or more UEs in accordance with a mapping result.

In one possible embodiment, the characteristic pattern mapping module 1010 is specifically configured to map the non-orthogonal characteristic patterns in a separate signal domain or a joint signal domain for the processed signals for the one or more UEs.

In one possible embodiment, the signal domain includes parts of or all of a power domain, a space domain and an encoding domain.

In one possible embodiment, the transmitting device is a network side device. In the case that non-orthogonal characteristic pattern is a non-orthogonal characteristic pattern in a power domain, the characteristic pattern mapping module 1010 is specifically configured to allocate an identical transmission time and an identical frequency resource to the signals for the plurality of UEs and allocate transmission power to the signals for the UEs in accordance with the non-orthogonal characteristic patterns in the power domain, and a sum of the transmission power allocated to all the UEs being equal to total system-available power. In the case that the non-orthogonal characteristic pattern is a non-orthogonal characteristic pattern in the space domain, the characteristic pattern mapping module 1010 is specifically configured to allocate an identical transmission time and an identical frequency resource to the signals for the plurality of UEs and allocate at least two transmission antenna ports to the signal for at least one UE in accordance with the non-orthogonal characteristic patterns in the space domain, and at least one of the transmission antenna ports corresponding to the signals for at least two UEs. In the case that the non-orthogonal characteristic pattern is a non-orthogonal characteristic pattern in the encoding domain, the characteristic pattern mapping module 1010 is specifically configured to allocate an identical transmission time and an identical frequency resource to the signals for the plurality of UEs and allocate different encoding modes and different transmission delays to the signals for the one or more UEs in accordance with the non-orthogonal characteristic patterns in the encoding domain.

In one possible embodiment, the transmitting device is a network side device. In the case that the non-orthogonal characteristic pattern is a non-orthogonal characteristic pattern in a joint signal domain consisting of the power domain and the space domain, the characteristic pattern mapping module 1010 is specifically configured to allocate an identical transmission time and an identical frequency resource to the signals for the plurality of UEs, allocate transmission power to the signals for the UEs in accordance with the non-orthogonal characteristic pattern in the joint signal domain consisting of the power domain and the space domain, and allocate at least two transmission antenna ports to the signal for at least one UE, a sum of the transmission power allocated to all the UEs being equal to total system-available power, and the at least one transmission antenna port corresponding to the signals for at least two UEs. In the case that the non-orthogonal characteristic pattern is a non-orthogonal characteristic pattern in a joint signal domain consisting of the power domain and the encoding domain, the characteristic pattern mapping module 1010 is specifically configured to allocate an identical transmission time and an identical frequency resource to the signals for the plurality of UEs, allocate transmission power to the signals for the UEs in accordance with the non-orthogonal characteristic patterns in the joint signal domain consisting of the power domain and the encoding domain, and allocate different encoding modes and different transmission delays to the signals for the UEs, and a sum of the transmission power allocated to all the UEs being equal to total system-available power. In the case that the non-orthogonal characteristic pattern is a non-orthogonal characteristic pattern in a joint signal domain consisting of the space domain and the encoding domain, the characteristic pattern mapping module 1010 is specifically configured to allocate an identical transmission time and an identical frequency resource to the signals for the plurality of UEs, allocate at least two transmission antenna ports to the signal for at least one UE in accordance with the non-orthogonal characteristic patterns in the joint signal domain consisting of the space domain and the encoding domain, and allocate different encoding modes and different transmission delays to the signals for the UEs, and at least one of the transmission antenna ports corresponding to the signals for at least two UEs. In the case that the non-orthogonal characteristic patterns is a non-orthogonal characteristic pattern in a joint signal domain consisting of the power domain, the space domain and the encoding domain, the characteristic pattern mapping module 1010 is specifically configured to allocate an identical transmission time and an identical frequency resource to the signals for the plurality of UEs, allocate transmission power to the UEs in accordance with the non-orthogonal characteristic patterns in the joint signal domain consisting of the power domain, the space domain and the encoding domain, allocate at least two transmission antenna ports to the signal for at least one UE, and allocate different encoding modes and different transmission delays to the signals for the UEs, a sum of the transmission power allocated to all the UEs being equal to total system-available power, and at least one of the transmission antenna ports corresponding to the signals for at least two UEs.

In one possible embodiment, the transmitting device is a UE. In the case that the non-orthogonal characteristic pattern is a non-orthogonal characteristic pattern in the power domain, the characteristic pattern mapping module 1010 is specifically configured to determine a transmission time and a frequency resource for its own signal, and determine transmission power for its own signal in accordance with its own non-orthogonal characteristic pattern in the power domain, and the transmission time and the frequency resource for the signal being identical to those for a signal for another UE. In the case that the non-orthogonal characteristic pattern is a non-orthogonal characteristic pattern in the space domain, the characteristic pattern mapping module 1010 is specifically configured to determine a transmission time and a frequency resource for its own signal, and determine a transmission antenna port corresponding to its own signal in accordance with its own non-orthogonal characteristic pattern in the space domain, and the transmission time and the frequency resource for the signal being identical to those for a signal for another UE. In the case that the non-orthogonal characteristic pattern is a non-orthogonal characteristic pattern in the encoding domain, the characteristic pattern mapping module 1010 is specifically configured to determine a transmission time and a frequency resource for its own signal, and determine an encoding mode and a transmission delay for its own signal in accordance with its own non-orthogonal characteristic pattern in the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE.

In one possible embodiment, the transmitting device is a UE. In the case that the non-orthogonal characteristic pattern is a non-orthogonal characteristic pattern in a joint signal domain consisting of the power domain and the space domain, the characteristic pattern mapping module 1010 is specifically configured to determine a transmission time and a frequency resource for its own signal, and determine transmission power and a corresponding transmission antenna port for its own signal in accordance with its own non-orthogonal characteristic pattern in the joint signal domain consisting of the power domain and the space domain, and the transmission time and the frequency resource for the signal being identical to those for a signal for another UE. In the case that the non-orthogonal characteristic pattern is a non-orthogonal characteristic pattern in a joint signal domain consisting of the power domain and the encoding domain, the characteristic pattern mapping module 1010 is specifically configured to determine a transmission time and a frequency resource for its own signal, and determine transmission power, an encoding mode and a transmission delay for its own signal in accordance with its own non-orthogonal characteristic pattern in the joint signal domain consisting of the power domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE. In the case that the non-orthogonal characteristic is a non-orthogonal characteristic pattern in a joint signal domain consisting of the space domain and the encoding domain, the characteristic pattern mapping module 1010 is specifically configured to determine a transmission time and a frequency resource for its own signal, and determine a transmission antenna port, an encoding mode and a transmission delay for its own signal in accordance with its own non-orthogonal characteristic pattern in the joint signal domain consisting of the space domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE. In the case that the non-orthogonal characteristic pattern is a non-orthogonal characteristic pattern in a joint signal domain consisting of the power domain, the space domain and the encoding domain, the characteristic pattern mapping module 1010 is specifically configured to determine a transmission time and a frequency resource for its own signal, and determine a transmission antenna port, transmission power, an encoding mode and a transmission delay for its own signal in accordance with its own non-orthogonal characteristic pattern in the joint signal domain consisting of the power domain, the space domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE.

Figure 11:
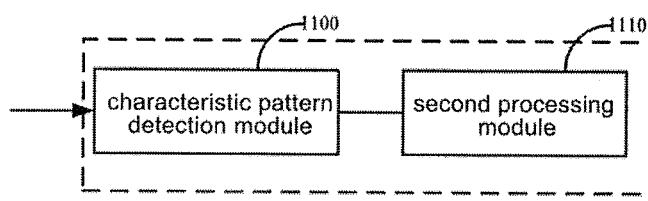
FIG. 11 is a schematic view showing a receiving device in the system for data transmission according to the third embodiment of the present disclosure.

As shown in FIG. 11, the present disclosure provides in the third embodiment a receiving device in the system for data transmission, which includes: a characteristic pattern detection module 1100 configured to detect non-orthogonal characteristic patterns for received signals for a plurality of UEs, so as to determine the non-orthogonal characteristic patterns corresponding to the received signal; and a second processing module 1110 configured to detect the received signals in a serial interference cancellation manner using the detected non-orthogonal characteristic patterns, and process the received signals, so as to determine data for different UEs.

In one possible embodiment, the characteristic pattern detection module 1100 is specifically configured to detect the non-orthogonal characteristic patterns in a separate signal domain or a joint signal domain for the received signals.

In one possible embodiment, the characteristic pattern detection module 1100 is further configured to receive through signaling, or blind-detecting the non-orthogonal characteristic patterns in the separate signal domain or the joint signal domain.

In one possible embodiment, the signal domain includes parts of or all of a power domain, a space domain and an encoding domain.

In one possible embodiment, the characteristic pattern detection module 1100 is specifically configured to: in the case that non-orthogonal characteristic patterns in the power domain are used, the received signals for the plurality of UEs have an identical transmission time and an identical frequency resource but the UEs have different transmission power, determine that the non-orthogonal characteristic patterns contained in the received signals are the non-orthogonal characteristic patterns in the power domain; or in the case that non-orthogonal characteristic patterns in the space domain are used, the received signals for the plurality of UEs have an identical transmission time and an identical frequency resource, the signal for at least one UE corresponds to at least two transmission antenna ports and at least one reception antenna port corresponding to the signals for at least two UEs, determine that the non-orthogonal characteristic patterns contained in the received signals are the non-orthogonal characteristic patterns in the space domain; or in the case that the non-orthogonal characteristic patterns in the encoding domain are adopted and the received signals for the plurality of UEs have an identical transmission time and an identical frequency resource and have different encoding modes and different transmission delays, determine that the non-orthogonal characteristic patterns contained in the received signals are the non-orthogonal characteristic patterns in the encoding domain.

In one possible embodiment, the characteristic pattern detection module 1100 is specifically configured to: in the case that the non-orthogonal characteristic patterns in a joint signal domain consisting of the power domain and the space domain are adopted, the received signals for the plurality of UEs have an identical transmission time, an identical frequency resource and different transmission power, the signal for at least one UE corresponds to at least two transmission antenna ports and at least one reception antenna port corresponds to the signals for at least two UEs, determine that the non-orthogonal characteristic patterns contained in the received signals are the non-orthogonal characteristic patterns in the joint signal domain consisting of the power domain and the space domain; or in the case that the non-orthogonal characteristic patterns in a joint signal domain consisting of the power domain and the encoding domain are adopted, and the received signals for the plurality of UEs have an identical transmission time, an identical frequency resource, different transmission power, different encoding modes and different transmission delays, determine that the non-orthogonal characteristic patterns contained in the received signals are the non-orthogonal characteristic patterns in the joint signal domain consisting of the power domain and the encoding domain; or in the case that the non-orthogonal characteristic patterns in a joint signal domain consisting of the space domain and the encoding domain, the received signals for the plurality of UEs have an identical transmission time, an identical frequency resource, different encoding modes and different transmission delays, the signal for at least one UE corresponds to at least two transmission antenna ports and at least one reception antenna port corresponds to the signals for at least two UEs, determine that the non-orthogonal characteristic patterns contained in the received signals are non-orthogonal characteristic patterns in the joint signal domain consisting of the space domain and the encoding domain; or in the case that the non-orthogonal characteristic patterns in a joint signal domain consisting of the power domain, the space domain and the encoding domain are adopted, the received signals for the plurality of UEs have an identical transmission time, an identical frequency resource, different transmission power, different encoding modes and different transmission delays, the signal for at least one UE corresponds to at least two transmission antenna ports and at least one reception antenna port corresponds to the signals for at least two UEs, determine that the non-orthogonal characteristic patterns contained in the received signals are the non-orthogonal characteristic patterns in the joint signal domain consisting of the power domain, the space domain and the encoding domain.

During the implementation, the transmitting device may also be used as the receiving device, and the receiving device may also be used as the transmitting device. Hence, the functions of the transmitting device and the receiving device may be integrated into an identical entity (i.e., the modules shown in FIG. 10 and FIG. 11 may be integrated into an identical entity), and the transmission or reception function may be selected in accordance with the practical need.

Figure 12:
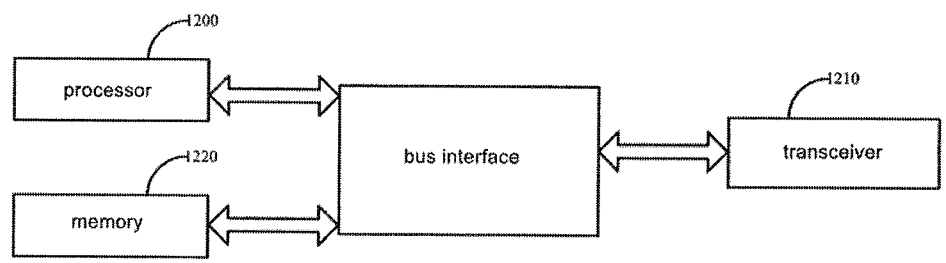
FIG. 12 is a schematic view showing the transmitting device in the system for data transmission according to the fourth embodiment of the present disclosure.

As shown in FIG. 12, the present disclosure provides in the fourth embodiment a transmitting device in the system for data transmission, which includes: a processor 1200 and a transceiver 1210. The processor 1200 is configured to process signals for one or more UEs, map non-orthogonal characteristic patterns for the processed signals for the one or more UEs so as to superpose the signals for different UEs on corresponding radio resources, and transmit, via the transceiver 1210, the processed signals for the one or more UEs in accordance with a mapping result. The transceiver

1210 is configured to transmit and receive data under the control of the processor 1200.

In one possible embodiment, the processor 1200 is specifically configured to map the non-orthogonal characteristic patterns in a separate signal domain or a joint signal domain for the processed signals for the one or more UEs.

In one possible embodiment, the signal domain includes parts of or all of a power domain, a space domain and an encoding domain.

In one possible embodiment, the transmitting device is a network side device. In the case that non-orthogonal characteristic pattern is a non-orthogonal characteristic pattern in a power domain, the processor 1200 is specifically configured to allocate an identical transmission time and an identical frequency resource to the signals for the plurality of UEs and allocate transmission power to the signals for the UEs in accordance with the non-orthogonal characteristic patterns in the power domain, and a sum of the transmission power allocated to all the UEs being equal to total system-available power. In the case that the non-orthogonal characteristic pattern is a non-orthogonal characteristic pattern in the space domain, the processor 1200 is specifically configured to allocate an identical transmission time and an identical frequency resource to the signals for the plurality of UEs and allocate at least two transmission antenna ports to the signal for at least one UE in accordance with the non-orthogonal characteristic patterns in the space domain, and at least one of the transmission antenna ports corresponding to the signals for at least two UEs. In the case that the non-orthogonal characteristic pattern is a non-orthogonal characteristic pattern in the encoding domain, the processor 1200 is specifically configured to allocate an identical transmission time and an identical frequency resource to the signals for the plurality of UEs and allocate different encoding modes and different transmission delays to the signals for the one or more UEs in accordance with the non-orthogonal characteristic patterns in the encoding domain.

In one possible embodiment, the transmitting device is a network side device. In the case that the non-orthogonal characteristic pattern is a non-orthogonal characteristic pattern in a joint signal domain consisting of the power domain and the space domain, the processor 1200 is specifically configured to allocate an identical transmission time and an identical frequency resource to the signals for the plurality of UEs, allocate transmission power to the signals for the UEs in accordance with the non-orthogonal characteristic pattern in the joint signal domain consisting of the power domain and the space domain, and allocate at least two transmission antenna ports to the signal for at least one UE, a sum of the transmission power allocated to all the UEs being equal to total system-available power, and the at least one transmission antenna port corresponding to the signals for at least two UEs. In the case that the non-orthogonal characteristic pattern is a non-orthogonal characteristic pattern in a joint signal domain consisting of the power domain and the encoding domain, the processor 1200 is specifically configured to allocate an identical transmission time and an identical frequency resource to the signals for the plurality of UEs, allocate transmission power to the signals for the UEs in accordance with the non-orthogonal characteristic patterns in the joint signal domain consisting of the power domain and the encoding domain, and allocate different encoding modes and different transmission delays to the signals for the UEs, and a sum of the transmission power allocated to all the UEs being equal to total system-available power. In the case that the non-orthogonal characteristic pattern is a non-orthogonal characteristic pattern in a joint signal domain consisting of the space domain and the encoding domain, the processor 1200 is specifically configured to allocate an identical transmission time and an identical frequency resource to the signals for the plurality of UEs, allocate at least two transmission antenna ports to the signal for at least one UE in accordance with the non-orthogonal characteristic patterns in the joint signal domain consisting of the space domain and the encoding domain, and allocate different encoding modes and different transmission delays to the signals for the UEs, and at least one of the transmission antenna ports corresponding to the signals for at least two UEs. In the case that the non-orthogonal characteristic patterns is a non-orthogonal characteristic pattern in a joint signal domain consisting of the power domain, the space domain and the encoding domain, the processor 1200 is specifically configured to allocate an identical transmission time and an identical frequency resource to the signals for the plurality of UEs, allocate transmission power to the UEs in accordance with the non-orthogonal characteristic patterns in the joint signal domain consisting of the power domain, the space domain and the encoding domain, allocate at least two transmission antenna ports to the signal for at least one UE, and allocate different encoding modes and different transmission delays to the signals for the UEs, a sum of the transmission power allocated to all the UEs being equal to total system-available power, and at least one of the transmission antenna ports corresponding to the signals for at least two UEs.

In one possible embodiment, the transmitting device is a UE. In the case that the non-orthogonal characteristic pattern is a non-orthogonal characteristic pattern in the power domain, the processor 1200 is specifically configured to determine a transmission time and a frequency resource for its own signal, and determine transmission power for its own signal in accordance with its own non-orthogonal characteristic pattern in the power domain, and the transmission time and the frequency resource for the signal being identical to those for a signal for another UE. In the case that the non-orthogonal characteristic pattern is a non-orthogonal characteristic pattern in the space domain, the processor 1200 is specifically configured to determine a transmission time and a frequency resource for its own signal, and determine a transmission antenna port corresponding to its own signal in accordance with its own non-orthogonal characteristic pattern in the space domain, and the transmission time and the frequency resource for the signal being identical to those for a signal for another UE. In the case that the non-orthogonal characteristic pattern is a non-orthogonal characteristic pattern in the encoding domain, the processor 1200 is specifically configured to determine a transmission time and a frequency resource for its own signal, and determine an encoding mode and a transmission delay for its own signal in accordance with its own non-orthogonal characteristic pattern in the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE.

In one possible embodiment, the transmitting device is a UE. In the case that the non-orthogonal characteristic pattern is a non-orthogonal characteristic pattern in a joint signal domain consisting of the power domain and the space domain, the processor 1200 is specifically configured to determine a transmission time and a frequency resource for its own signal, and determine transmission power and a corresponding transmission antenna port for its own signal in accordance with its own non-orthogonal characteristic pattern in the joint signal domain consisting of the power domain and the space domain, and the transmission time and the frequency resource for the signal being identical to those for a signal for another UE. In the case that the non-orthogonal characteristic pattern is a non-orthogonal characteristic pattern in a joint signal domain consisting of the power domain and the encoding domain, the processor 1200 is specifically configured to determine a transmission time and a frequency resource for its own signal, and determine transmission power, an encoding mode and a transmission delay for its own signal in accordance with its own non-orthogonal characteristic pattern in the joint signal domain consisting of the power domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE. In the case that the non-orthogonal characteristic is a non-orthogonal characteristic pattern in a joint signal domain consisting of the space domain and the encoding domain, the processor 1200 is specifically configured to determine a transmission time and a frequency resource for its own signal, and determine a transmission antenna port, an encoding mode and a transmission delay for its own signal in accordance with its own non-orthogonal characteristic pattern in the joint signal domain consisting of the space domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE. In the case that the non-orthogonal characteristic pattern is a non-orthogonal characteristic pattern in a joint signal domain consisting of the power domain, the space domain and the encoding domain, the processor 1200 is specifically configured to determine a transmission time and a frequency resource for its own signal, and determine a transmission antenna port, transmission power, an encoding mode and a transmission delay for its own signal in accordance with its own non-orthogonal characteristic pattern in the joint signal domain consisting of the power domain, the space domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE.

In FIG. 12, a bus architecture may include a number of buses and bridges connected to each other, so as to connect various circuits for one or more processors 1200 and one or more memories 1220. In addition, as is known in the art, the bus architecture may be used to connect any other circuits, such as a circuit for a peripheral device, a circuit for a voltage stabilizer and a power management circuit. Bus interfaces are provided, and the transceiver 1210 may consist of a transmitter and a receiver for communication with any other devices over a transmission medium. The processor 1200 may take charge of managing the bus architecture as well as general processings. The memory 1220 may store data desired for the operation of the processor 1200.

Figure 13:
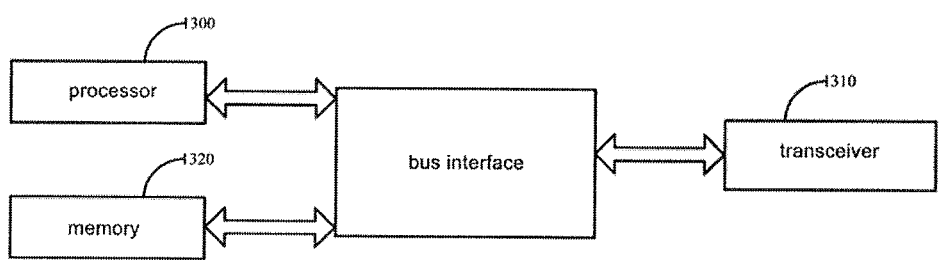
FIG. 13 is a schematic view showing the receiving device in the system for data transmission according to the fifth embodiment of the present disclosure.

As shown in FIG. 13, the present disclosure provides in the fifth embodiment a receiving device in the system for data transmission, which includes a processor 1300 and a transceiver 1310. The processor 1300 is configured to detect, via the transceiver 1310, non-orthogonal characteristic patterns for received signals for a plurality of UEs so as to determine the non-orthogonal characteristic patterns corresponding to the received signal, detect the received signals in a serial interference cancellation manner using the detected non-orthogonal characteristic patterns, and process the received signals, so as to determine data for different UEs. The transceiver 1310 is configured to transmit and receive data under the control of the processor 1300.

In one possible embodiment, the processor 1300 is configured to detect the non-orthogonal characteristic patterns in a separate signal domain or a joint signal domain for the received signals.

In one possible embodiment, the processor 1300 is further configured to receive through signaling, or blind-detecting the non-orthogonal characteristic patterns in the separate signal domain or the joint signal domain.

In one possible embodiment, the signal domain includes parts of or all of a power domain, a space domain and an encoding domain.

In one possible embodiment, the processor 1300 is specifically configured to: in the case that non-orthogonal characteristic patterns in the power domain are used, the received signals for the plurality of UEs have an identical transmission time and an identical frequency resource but the UEs have different transmission power, determine that the non-orthogonal characteristic patterns contained in the received signals are the non-orthogonal characteristic patterns in the power domain; in the case that non-orthogonal characteristic patterns in the space domain are used, the received signals for the plurality of UEs have an identical transmission time and an identical frequency resource, the signal for at least one UE corresponds to at least two transmission antenna ports and at least one reception antenna port corresponds to the signals for at least two UEs, determine that the non-orthogonal characteristic patterns contained in the received signals are the non-orthogonal characteristic patterns in the space domain; or in the case that the non-orthogonal characteristic patterns in the encoding domain are adopted and the received signals for the plurality of UEs have an identical transmission time and an identical frequency resource and have different encoding modes and different transmission delays, determine that the non-orthogonal characteristic patterns contained in the received signals are the non-orthogonal characteristic patterns in the encoding domain.

In one possible embodiment, the processor 1300 is specifically configured to: in the case that the non-orthogonal characteristic patterns in a joint signal domain consisting of the power domain and the space domain are adopted, the received signals for the plurality of UEs have an identical transmission time, an identical frequency resource and different transmission power, the signal for at least one UE corresponds to at least two transmission antenna ports and at least one reception antenna port corresponds to the signals for at least two UEs, determine that the non-orthogonal characteristic patterns contained in the received signals are the non-orthogonal characteristic patterns in the joint signal domain consisting of the power domain and the space domain; or in the case that the non-orthogonal characteristic patterns in a joint signal domain consisting of the power domain and the encoding domain are adopted, and the received signals for the plurality of UEs have an identical transmission time, an identical frequency resource, different transmission power, different encoding modes and different transmission delays, determine that the non-orthogonal characteristic patterns contained in the received signals are the non-orthogonal characteristic patterns in the joint signal domain consisting of the power domain and the encoding domain; or in the case that the non-orthogonal characteristic patterns in a joint signal domain consisting of the space domain and the encoding domain, the received signals for the plurality of UEs have an identical transmission time, an identical frequency resource, different encoding modes and different transmission delays, the signal for at least one UE corresponds to at least two transmission antenna ports and at least one reception antenna port corresponds to the signals for at least two UEs, determine that the non-orthogonal characteristic patterns contained in the received signals are non-orthogonal characteristic patterns in the joint signal domain consisting of the space domain the encoding domain; or in the case that the non-orthogonal characteristic patterns in a joint signal domain consisting of the power domain, the space domain and the encoding domain are adopted, the received signals for the plurality of UEs have an identical transmission time, an identical frequency resource, different transmission power, different encoding modes and different transmission delays, the signal for at least one UE corresponds to at least two transmission antenna ports and at least one reception antenna port corresponds to the signals for at least two UEs, determine that the non-orthogonal characteristic patterns contained in the received signals are the non-orthogonal characteristic patterns in the joint signal domain consisting of the power domain, the space domain and the encoding domain.

In FIG. 13, a bus architecture may include a number of buses and bridges connected to each other, so as to connect various circuits for one or more processors 1300 and one or more memories 1320. In addition, as is known in the art, the bus architecture may be used to connect any other circuits, such as a circuit for a peripheral device, a circuit for a voltage stabilizer and a power management circuit. Bus interfaces are provided, and the transceiver 1310 may consist of a transmitter and a receiver for communication with any other devices over a transmission medium. The processor 1300 may take charge of managing the bus architecture as well as general processings. The memory 1320 may store data desired for the operation of the processor 1300.

During the implementation, the transmitting device may also be used as the receiving device, and the receiving device may also be used as the transmitting device. Hence, the functions of the transmitting device and the receiving device may be integrated into an identical entity (i.e., the modules shown in FIG. 12 and FIG. 13 may be integrated into an identical entity), and the transmission or reception function may be selected in accordance with the practical need.

Based on an identical inventive concept, the present disclosure further provides in some embodiments a method for data transmission. The principle of the method is similar to that of the above-mentioned system for data transmission, so the implementations of the method may refer to those mentioned above and will not be particularly defined herein.

Figure 14:
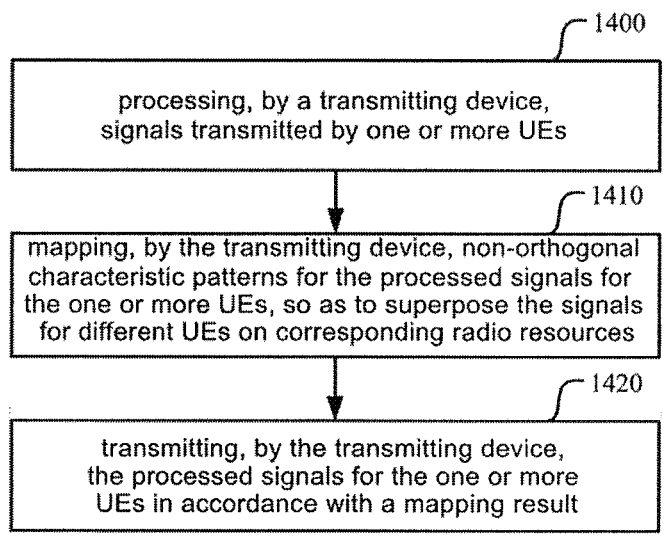
FIG. 14 is a flow chart of a method for data transmission according to the sixth embodiment of the present disclosure.

As shown in FIG. 14, the present disclosure provides in the sixth embodiment a method for data transmission, which includes: Step 1400 of processing, by a transmitting device, signals for one or more UEs; Step 1410 of mapping, by the transmitting device, non-orthogonal characteristic patterns for the processed signals for the one or more UEs, so as to superpose the signals for different UEs on corresponding radio resources; and Step 1420 of transmitting, by the transmitting device, the processed signals for the one or more UEs in accordance with a mapping result.

In one possible embodiment, the step of mapping, by the transmitting device, the non-orthogonal characteristic patterns for the processed signals for the one or more UEs includes: mapping, by the transmitting device, the non-orthogonal characteristic patterns in a separate signal domain or a joint signal domain for the processed signals for the one or more UEs.

In one possible embodiment, the signal domain includes parts of or all of a power domain, a space domain and an encoding domain.

In one possible embodiment, the transmitting device is a network side device. The non-orthogonal characteristic pattern is a non-orthogonal characteristic pattern in a power domain, the step of mapping, by the transmitting device, the non-orthogonal characteristic patterns for the processed signals for the one or more UEs includes: allocating, by the transmitting device, an identical transmission time and an identical frequency resource to the signals for the plurality of UEs and allocating transmission power to the signals for the UEs in accordance with the non-orthogonal characteristic patterns in the power domain, and a sum of the transmission power allocated to all the UEs being equal to total system-available power. In another possible embodiment, the non-orthogonal characteristic pattern is a non-orthogonal characteristic pattern in the space domain, the step of mapping, by the transmitting device, the non-orthogonal characteristic patterns for the processed signals for the UEs includes: allocating, by the transmitting device, an identical transmission time and an identical frequency resource to the signals for the plurality of UEs and allocating at least two transmission antenna ports to the signal for at least one UE in accordance with the non-orthogonal characteristic patterns in the space domain, and at least one of the transmission antenna ports corresponding to the signals for at least two UEs. In another possible embodiment, the non-orthogonal characteristic pattern is a non-orthogonal characteristic pattern in the encoding domain, and the step of mapping, by the transmitting device, the non-orthogonal characteristic patterns for the processed signals for the UEs includes: allocating, by the transmitting device, an identical transmission time and an identical frequency resource to the signals for the plurality of UEs and allocating different encoding modes and different transmission delays to the signals for the one or more UEs in accordance with the non-orthogonal characteristic patterns in the encoding domain.

In one possible embodiment, the transmitting device is a network side device. The non-orthogonal characteristic pattern is a non-orthogonal characteristic pattern in a joint signal domain consisting of the power domain and the space domain, the step of mapping, by the transmitting device, the non-orthogonal characteristic patterns for the processed signals for the UEs includes: allocating, by the transmitting device, an identical transmission time and an identical frequency resource to the signals for the plurality of UEs, allocating transmission power to the signals for the UEs in accordance with the non-orthogonal characteristic pattern in the joint signal domain consisting of the power domain and the space domain, and allocating at least two transmission antenna ports to the signal for at least one UE, a sum of the transmission power allocated to all the UEs being equal to total system-available power, and the at least one transmission antenna port corresponding to the signals for at least two UEs. In another possible embodiment, the non-orthogonal characteristic pattern is a non-orthogonal characteristic pattern in a joint signal domain consisting of the power domain and the encoding domain, the step of mapping, by the transmitting device, the non-orthogonal characteristic patterns for the processed signals for the UEs includes: allocating, by the transmitting device, an identical transmission time and an identical frequency resource to the signals for the plurality of UEs, allocating transmission power to the signals for the UEs in accordance with the non-orthogonal characteristic patterns in the joint signal domain consisting of the power domain and the encoding domain, and allocating different encoding modes and different transmission delays to the signals for the UEs, and a sum of the transmission power allocated to all the UEs being equal to total system-available power. In another possible embodiment, the non-orthogonal characteristic pattern is a non-orthogonal characteristic pattern in a joint signal domain consisting of the space domain and the encoding domain, the step of mapping, by the transmitting device, the non-orthogonal characteristic patterns for the processed signals for the UEs includes: allocating, by the transmitting device, an identical transmission time and an identical frequency resource to the signals for the plurality of UEs, allocating at least two transmission antenna ports to the signal for at least one UE in accordance with the non-orthogonal characteristic patterns in the joint signal domain consisting of the space domain and the encoding domain, and allocating different encoding modes and different transmission delays to the signals for the UEs, and at least one of the transmission antenna ports corresponding to the signals for at least two UEs. In another possible embodiment, the non-orthogonal characteristic patterns is a non-orthogonal characteristic pattern in a joint signal domain consisting of the power domain, the space domain and the encoding domain, the step of mapping, by the transmitting device, the non-orthogonal characteristic patterns for the processed signals for the UEs includes: allocating, by the transmitting device, an identical transmission time and an identical frequency resource to the signals for the plurality of UEs, allocating transmission power to the UEs in accordance with the non-orthogonal characteristic patterns in the joint signal domain consisting of the power domain, the space domain and the encoding domain, allocating at least two transmission antenna ports to the signal for at least one UE, and allocating different encoding modes and different transmission delays to the signals for the UEs, a sum of the transmission power allocated to all the UEs being equal to total system-available power, and at least one of the transmission antenna ports corresponding to the signals for at least two UEs.

In one possible embodiment, the transmitting device is a UE. The non-orthogonal characteristic pattern is a non-orthogonal characteristic pattern in the power domain, the step of mapping, by the transmitting device, the non-orthogonal characteristic pattern for the processed signal for one UE includes: determining, by the transmitting device, a transmission time and a frequency resource for its own signal, and determining transmission power for its own signal in accordance with its own non-orthogonal characteristic pattern in the power domain, and the transmission time and the frequency resource for the signal being identical to those for a signal for another UE. In another possible embodiment, the non-orthogonal characteristic pattern is a non-orthogonal characteristic pattern in the space domain, the step of mapping, by the transmitting device, the non-orthogonal characteristic pattern for the processed signal for one UE includes: determining, by the transmitting device, a transmission time and a frequency resource for its own signal, and determining a transmission antenna port corresponding to its own signal in accordance with its own non-orthogonal characteristic pattern in the space domain, and the transmission time and the frequency resource for the signal being identical to those for a signal for another UE. In another possible embodiment, the non-orthogonal characteristic pattern is a non-orthogonal characteristic pattern in the encoding domain, the step of mapping, by the transmitting device, the non-orthogonal characteristic pattern for the processed signal for one UE includes: determining, by the transmitting device, a transmission time and a frequency resource for its own signal, and determining an encoding mode and a transmission delay for its own signal in accordance with its own non-orthogonal characteristic pattern in the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE.

In one possible embodiment, the transmitting device is a UE. The non-orthogonal characteristic pattern is a non-orthogonal characteristic pattern in a joint signal domain consisting of the power domain and the space domain, the step of mapping, by the transmitting device, the non-orthogonal characteristic pattern for the processed signal for one UE includes: determining, by the transmitting device, a transmission time and a frequency resource for its own signal, and determining transmission power and a corresponding transmission antenna port for its own signal in accordance with its own non-orthogonal characteristic pattern in the joint signal domain consisting of the power domain and the space domain, and the transmission time and the frequency resource for the signal being identical to those for a signal for another UE. In another possible embodiment, the non-orthogonal characteristic pattern is a non-orthogonal characteristic pattern in a joint signal domain consisting of the power domain and the encoding domain, the step of mapping, by the transmitting device, the non-orthogonal characteristic pattern for the processed signal for one UE includes: determining, by the transmitting device, a transmission time and a frequency resource for its own signal, and determining transmission power, an encoding mode and a transmission delay for its own signal in accordance with its own non-orthogonal characteristic pattern in the joint signal domain consisting of the power domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE. In another possible embodiment, the non-orthogonal characteristic is a non-orthogonal characteristic pattern in a joint signal domain consisting of the space domain and the encoding domain, the step of mapping, by the transmitting device, the non-orthogonal characteristic pattern for the processed signal for one UE includes: determining, by the transmitting device, a transmission time and a frequency resource for its own signal, and determining a transmission antenna port, an encoding mode and a transmission delay for its own signal in accordance with its own non-orthogonal characteristic pattern in the joint signal domain consisting of the space domain and the encoding domain, the transmission time and the frequency resource for the signal being identical to those for a signal for another UE, the encoding mode for the signal for the transmitting device is different from that for the signal for the other UE, and the transmission delay for the signal for the transmitting device is different from that for the signal for the other UE. In another possible embodiment, the non-orthogonal characteristic pattern is a non-orthogonal characteristic pattern in a joint signal domain consisting of the power domain, the space domain and the encoding domain, the step of mapping, by the transmitting device, the non-orthogonal characteristic pattern for the processed signal for one UE includes: determining, by the transmitting device, a transmission time and a frequency resource for its own signal, and determining a transmission antenna port, transmission power, an encoding mode and a transmission delay for its own signal in accordance with its own non-orthogonal characteristic pattern in the joint signal domain consisting of the power domain, the space domain and the encoding domain, the transmission time and the frequency resource for the signal being identical to those for a signal for another UE, the encoding mode for the signal for the transmitting device being different from that for the signal for the other UE, and the transmission delay for the signal for the transmitting device being different from that for the signal for the other UE.

Figure 15:
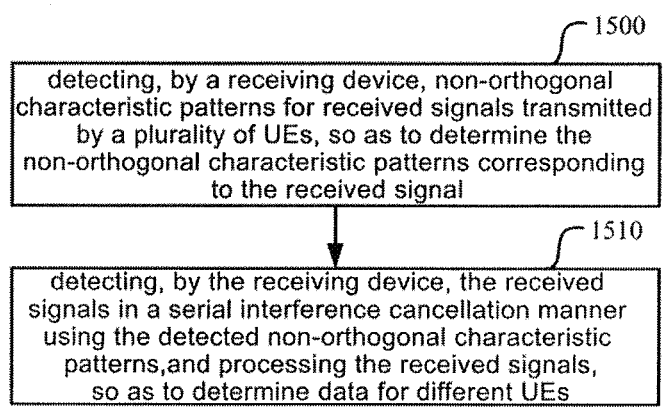
FIG. 15 is a flow chart of a method for data transmission according to the seventh embodiment of the present disclosure.

As shown in FIG. 15, the present disclosure provides in the seventh embodiment a method for data transmission, which includes: Step 1500 of detecting, by a receiving device, non-orthogonal characteristic patterns for received signals for a plurality of UEs, so as to determine the non-orthogonal characteristic patterns corresponding to the received signal; and Step 1510 of detecting, by the receiving device, the received signals in a serial interference cancellation manner using the detected non-orthogonal characteristic patterns, and processing the received signals, so as to determine data for different UEs.

In one possible embodiment, the step of detecting, by the receiving device, the non-orthogonal characteristic patterns for the received signals for the UEs includes: detecting, by the receiving device, the non-orthogonal characteristic patterns in a separate signal domain or a joint signal domain for the received signals.

In one possible embodiment, prior to the step of detecting, by the receiving device, the non-orthogonal characteristic pattern for the received signals for the UEs, the method further includes: receiving through signaling, or blind-detecting, by the receiving device, the non-orthogonal characteristic patterns in the separate signal domain or the joint signal domain.

In one possible embodiment, the signal domain includes parts of or all of a power domain, a space domain and an encoding domain.

In one possible embodiment, the step of detecting, by the receiving device, the non-orthogonal characteristic patterns for the received signals for the plurality of UEs includes: in the case that non-orthogonal characteristic patterns in the power domain are used and the receiving device determines that the received signals for the plurality of UEs have an identical transmission time and an identical frequency resource but the UEs have different transmission power, determining, by the receiving device, that the non-orthogonal characteristic patterns contained in the received signals are the non-orthogonal characteristic patterns in the power domain; or in the case that non-orthogonal characteristic patterns in the space domain are used and the receiving device determines that the received signals for the plurality of UEs have an identical transmission time and an identical frequency resource, the signal for at least one UE corresponds to at least two transmission antenna ports and at least one reception antenna port corresponds to the signals for at least two UEs, determining, by the receiving device, that the non-orthogonal characteristic patterns contained in the received signals are the non-orthogonal characteristic patterns in the space domain; or in the case that the non-orthogonal characteristic patterns in the encoding domain are adopted and the receiving device determines that the received signals for the plurality of UEs have an identical transmission time and an identical frequency resource and have different encoding modes and different transmission delays, determining, by the receiving device, that the non-orthogonal characteristic patterns contained in the received signals are the non-orthogonal characteristic patterns in the encoding domain.

In one possible embodiment, the step of detecting, by the receiving device, the non-orthogonal characteristic patterns for the received signals for the plurality of UEs includes: in the case that the non-orthogonal characteristic patterns in a joint signal domain consisting of the power domain and the space domain are adopted, and the receiving device determines that the received signals for the plurality of UEs have an identical transmission time, an identical frequency resource and different transmission power, the signal for at least one UE corresponds to at least two transmission antenna ports and at least one reception antenna port corresponds to the signals for at least two UEs, determining, by the receiving device, that the non-orthogonal characteristic patterns contained in the received signals are the non-orthogonal characteristic patterns in the joint signal domain consisting of the power domain and the space domain; or in the case that the non-orthogonal characteristic patterns in a joint signal domain consisting of the power domain and the encoding domain are adopted, and the receiving device determines that the received signals for the plurality of UEs have an identical transmission time, an identical frequency resource, different transmission power, different encoding modes and different transmission delays, determining, by the receiving device, that the non-orthogonal characteristic patterns contained in the received signals are the non-orthogonal characteristic patterns in the joint signal domain consisting of the power domain and the encoding domain; or in the case that the non-orthogonal characteristic patterns in a joint signal domain consisting of the space domain and the encoding domain, and the receiving device determines that the received signals for the plurality of UEs have an identical transmission time, an identical frequency resource, different encoding modes and different transmission delays, the signal for at least one UE corresponds to at least two transmission antenna ports and at least one reception antenna port corresponds to the signals for at least two UEs, determining, by the receiving device, that the non-orthogonal characteristic patterns contained in the received signals are non-orthogonal characteristic patterns in the joint signal domain consisting of the space domain the encoding domain; or in the case that the non-orthogonal characteristic patterns in a joint signal domain consisting of the power domain, the space domain and the encoding domain are adopted, and the receiving device determines that the received signals for the plurality of UEs have an identical transmission time, an identical frequency resource, different transmission power, different encoding modes and different transmission delays, the signal for at least one UE corresponds to at least two transmission antenna ports and at least one reception antenna port corresponds to the signals for at least two UEs, determining, by the receiving device, that the non-orthogonal characteristic patterns contained in the received signals are the non-orthogonal characteristic patterns in the joint signal domain consisting of the power domain, the space domain and the encoding domain.

According to the embodiments of the present disclosure, the transmitting device may process the signals for one or more UEs, map the non-orthogonal characteristic patterns for the processed signals for the one or more UEs so as to superpose the signals for different UEs on the corresponding radio resources, and transmit the processed signals for the one or more UEs in accordance with a mapping result. As a result, it is able for the signals for the one or more UEs to be superposed non-orthogonally on the radio resources, thereby to achieve the data transmission in a non-orthogonal multiple access manner, and improve the radio resource utilization.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc Read-Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments have been described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A method for data transmission realized by a network side device, comprising:
  detecting, by the network side device, non-orthogonal characteristic patterns in a joint signal domain for received signals transmitted by a plurality of User Equipments (UEs), so as to determine the non-orthogonal characteristic patterns corresponding to the received signals; and
  detecting, by the network side device, the received signals in a Serial Interference Cancellation (SIC) manner using the detected non-orthogonal characteristic patterns, and processing the received signals, so as to determine data for different UEs,
  wherein the joint signal domain comprises at least one of: a first joint signal domain consisting of the power domain and the space domain, a second joint signal domain consisting of the power domain and the encoding domain, a third joint signal domain consisting of the space domain and the encoding domain, or a fourth joint signal domain consisting of the power domain, the space domain and the encoding domain,
  wherein the non-orthogonal characteristic patterns are superposing patterns of signals having certain characteristics on identical time-domain and frequency-domain resources in such a manner that the signals cannot be divided orthogonally on the same time-domain and frequency-domain resources; and
  wherein the mapping non-orthogonal characteristic patterns refers to transmitting, on the same time-domain and frequency-domain resources, signals for a plurality of users superposed in accordance with their non-orthogonal characteristic patterns, such that the signal for each user corresponds to one of the non-orthogonal characteristic patterns,
  wherein
    in the case that the non-orthogonal characteristic patterns in the first joint signal domain consisting of the power domain and the space domain are adopted, and the network side device determines that the received signals transmitted by the plurality of UEs have an identical transmission time, an identical frequency resource and different transmission power, wherein the signal transmitted by at least one UE corresponds to at least two transmission antenna ports and at least one reception antenna port corresponds to the signals transmitted by at least two UEs, determining, by the network side device, that the non-orthogonal characteristic patterns contained in the received signals are the non-orthogonal characteristic patterns in the joint signal domain consisting of the power domain and the space domain; or
    in the case that the non-orthogonal characteristic patterns in the second joint signal domain consisting of the power domain and the encoding domain are adopted, and the network side device determines that the received signals transmitted by the plurality of UEs have an identical transmission time, an identical frequency resource, different transmission power, different encoding modes and different transmission delays, determining, by the network side device, that the non-orthogonal characteristic patterns contained in the received signals are the non-orthogonal characteristic patterns in the joint signal domain consisting of the power domain and the encoding domain; or in the case that the non-orthogonal characteristic patterns in the third joint signal domain consisting of the space domain and the encoding domain, and the network side device determines that the received signals transmitted by the plurality of UEs have an identical transmission time, an identical frequency resource, different encoding modes and different transmission delays, wherein the signal transmitted by at least one UE corresponds to at least two transmission antenna ports and at least one reception antenna port corresponds to the signals transmitted by at least two UEs, determining, by the network side device, that the non-orthogonal characteristic patterns contained in the received signals are non-orthogonal characteristic patterns in the joint signal domain consisting of the space domain and the encoding domain; or in the case that the non-orthogonal characteristic patterns in the fourth joint signal domain consisting of the power domain, the space domain and the encoding domain are adopted, and the network side device determines that the received signals transmitted by the plurality of UEs have an identical transmission time, an identical frequency resource, different transmission power, different encoding modes and different transmission delays, wherein the signal transmitted by at least one UE corresponds to at least two transmission antenna ports and at least one reception antenna port corresponds to the signals transmitted by at least two UEs, determining, by the network side device, that the non-orthogonal characteristic patterns contained in the received signals are the non-orthogonal characteristic patterns in the joint signal domain consisting of the power domain, the space domain and the encoding domain.

2. The method according to claim 1, wherein prior to the step of detecting, by the network side device, the non-orthogonal characteristic pattern for the received signals transmitted by the plurality of the UEs, the method further comprises: receiving through signaling, or blind-detecting, by the network side device, the non-orthogonal characteristic patterns in the joint signal domain.

3. The method according to claim 1, wherein the step of detecting, by the network side device, the non-orthogonal characteristic patterns is realized in a separate signal domain including a power domain, a space domain, or an encoding domain for the received signals transmitted by the plurality of UEs;

in the case that non-orthogonal characteristic patterns in the power domain are used and the network side device determines that the received signals transmitted by the plurality of UEs have an identical transmission time and an identical frequency resource but the UEs have different transmission power, determining, by the network side device, that the non-orthogonal characteristic patterns contained in the received signals are the non-orthogonal characteristic patterns in the power domain; or in the case that non-orthogonal characteristic patterns in the space domain are used and the network side device determines that the received signals transmitted by the plurality of UEs have an identical transmission time and an identical frequency resource, the signal transmitted by at least one UE corresponds to at least two transmission antenna ports and at least one reception antenna port corresponds to the signals transmitted by at least two UEs, determining, by the network side device, that the non-orthogonal characteristic patterns contained in the received signals are the non-orthogonal characteristic patterns in the space domain; or in the case that the non-orthogonal characteristic patterns in the encoding domain are adopted and the network side device determines that the received signals transmitted by the plurality of UEs have an identical transmission time and an identical frequency resource and have different encoding modes and different transmission delays, determining, by the network side device, that the non-orthogonal characteristic patterns contained in the received signals are the non-orthogonal characteristic patterns in the encoding domain.

4. A method for data transmission realized by a User Equipment (UE), comprising:

processing, by the UE, signals transmitted by the UE to a network side device;

mapping, by the UE, non-orthogonal characteristic patterns in a joint signal domain for the processed signals transmitted by the UE to the network side device, so as to superpose the signals from different UEs on corresponding radio resources; and transmitting, by the UE, the processed signals transmitted by the UE to the network side device in accordance with a mapping result, wherein the joint signal domain comprises at least one of: a first joint signal domain consisting of the power domain and the space domain, a second joint signal domain consisting of the power domain and the encoding domain, a third joint signal domain consisting of the space domain and the encoding domain, or a fourth joint signal domain consisting of the power domain, the space domain and the encoding domain, wherein the non-orthogonal characteristic patterns are superposing patterns of signals having certain characteristics on identical time-domain and frequency-domain resources in such a manner that the signals cannot be divided orthogonally on the same time-domain and frequency-domain resources; and wherein the mapping non-orthogonal characteristic patterns refers to transmitting, on the same time-domain and frequency-domain resources, signals for a plurality of users superposed in accordance with their non-orthogonal characteristic patterns, such that the signal for each user corresponds to one of the non-orthogonal characteristic patterns, wherein in the case that the non-orthogonal characteristic pattern is a non-orthogonal characteristic pattern in the first joint signal domain consisting of the power domain and the space domain, the step of mapping, by the UE, the non-orthogonal characteristic pattern for the processed signal for one UE comprises: determining, by the UE, a transmission time and a frequency resource for its own signal, and determining transmission power and a corresponding transmission antenna port for its own signal in accordance with its own non-orthogonal characteristic pattern in the joint signal domain consisting of the power domain and the space domain, and wherein the transmission time and the frequency resource for the signal transmitted by the UE are identical to those for a signal transmitted by another UE; or in the case that the non-orthogonal characteristic pattern is a non-orthogonal characteristic pattern in the second joint signal domain consisting of the power domain and the encoding domain, the step of mapping, by the UE, the non-orthogonal characteristic pattern for the processed signal for one UE comprises: determining, by the UE, a transmission time and a frequency resource for its own signal, and determining transmission power, an encoding mode and a transmission delay for its own signal in accordance with its own non-orthogonal characteristic pattern in the joint signal domain consisting of the power domain and the encoding domain, wherein the transmission time and the frequency resource for the signal are identical to those for a signal transmitted by another UE, wherein the encoding mode for the signal transmitted by the UE is different from that for the signal transmitted by the other UE, and wherein the transmission delay for the signal transmitted by the UE is different from that for the signal transmitted by the other UE; or in the case that the non-orthogonal characteristic pattern is a non-orthogonal characteristic pattern in the third joint signal domain consisting of the space domain and the encoding domain, the step of mapping, by the UE, the non-orthogonal characteristic pattern for the processed signal for one UE comprises: determining, by the UE, a transmission time and a frequency resource for its own signal, and determining a transmission antenna port, an encoding mode and a transmission delay for its own signal in accordance with its own non-orthogonal characteristic pattern in the joint signal domain consisting of the space domain and the encoding domain, wherein the transmission time and the frequency resource for the signal transmitted by the UE are identical to those for a signal transmitted by another UE, wherein the encoding mode for the signal transmitted by the UE is different from that for the signal transmitted by the other UE, and wherein the transmission delay for the signal transmitted by the UE is different from that for the signal transmitted by the other UE; or in the case that the non-orthogonal characteristic pattern is a non-orthogonal characteristic pattern in the fourth joint signal domain consisting of the power domain, the space domain and the encoding domain, the step of mapping, by the UE, the non-orthogonal characteristic pattern for the processed signal for one UE comprises: determining, by the UE, a transmission time and a frequency resource for its own signal, and determining a transmission antenna port, transmission power, an encoding mode and a transmission delay for its own signal in accordance with its own non-orthogonal characteristic pattern in the joint signal domain consisting of the power domain, the space domain and the encoding domain, wherein the transmission time and the frequency resource for the signal transmitted by the UE are identical to those for a signal transmitted by another UE, wherein the encoding mode for the signal transmitted by the UE is different from that for the signal transmitted by the other UE, and wherein the transmission delay for the signal transmitted by the UE is different from that for the signal transmitted by the other UE.

5. The method according to claim 4, wherein the mapping step is realized in a separate signal domain including a power domain, a space domain, or an encoding domain;

in the case that the non-orthogonal characteristic pattern is a non-orthogonal characteristic pattern in the power domain, the step of mapping, by the UE, the non-orthogonal characteristic pattern for the processed signal for one UE comprises: determining, by the UE, a transmission time and a frequency resource for its own signal, and determining transmission power for its own signal in accordance with its own non-orthogonal characteristic pattern in the power domain, and wherein the transmission time and the frequency resource for the signal are identical to those for a signal transmitted by another UE; or in the case that the non-orthogonal characteristic pattern is a non-orthogonal characteristic pattern in the space domain, the step of mapping, by the UE, the non-orthogonal characteristic pattern for the processed signal for one UE comprises: determining, by the UE, a transmission time and a frequency resource for its own signal, and determining a transmission antenna port corresponding to its own signal in accordance with its own non-orthogonal characteristic pattern in the space domain, and wherein the transmission time and the frequency resource for the signal are identical to those for a signal transmitted by another UE; or in the case that the non-orthogonal characteristic pattern is a non-orthogonal characteristic pattern in the encoding domain, the step of mapping, by the UE, the non-orthogonal characteristic pattern for the processed signal for one UE comprises: determining, by the UE, a transmission time and a frequency resource for its own signal, and determining an encoding mode and a transmission delay for its own signal in accordance with its own non-orthogonal characteristic pattern in the encoding domain, wherein the transmission time and the frequency resource for the signal transmitted by the UE are identical to those for a signal transmitted by another UE, wherein the encoding mode for the signal transmitted by the UE is different from that for the signal transmitted by the other UE, and wherein the transmission delay for the signal transmitted by the UE is different from that for the signal transmitted by the other UE.

* * * * *